United States Patent
Takahata et al.

(10) Patent No.: US 8,509,490 B2
(45) Date of Patent: Aug. 13, 2013

(54) TRAJECTORY PROCESSING APPARATUS AND METHOD

(75) Inventors: Masami Takahata, Tokyo (JP); Takashi Koiso, Kawasaki (JP); Masaki Narahashi, Tokyo (JP); Tomonori Ikumi, Numazu (JP)

(73) Assignee: Toshiba Tec Kabushiki Kaisha (JP)

( * ) Notice: Subject to any disclaimer, the term of this patent is extended or adjusted under 35 U.S.C. 154(b) by 0 days.

(21) Appl. No.: 13/396,101

(22) Filed: Feb. 14, 2012

(65) Prior Publication Data
US 2012/0147144 A1 Jun. 14, 2012

Related U.S. Application Data

(62) Division of application No. 12/215,603, filed on Jun. 26, 2008, now Pat. No. 8,139,818.

(30) Foreign Application Priority Data

| Jun. 28, 2007 | (JP) | 2007-170703 |
| Jun. 28, 2007 | (JP) | 2007-170704 |
| Jun. 28, 2007 | (JP) | 2007-170705 |
| Jun. 28, 2007 | (JP) | 2007-170706 |
| Oct. 31, 2007 | (JP) | 2007-283727 |

(51) Int. Cl.
*G06K 9/00* (2006.01)
(52) U.S. Cl.
USPC .............. 382/107; 382/305; 707/E17.028
(58) Field of Classification Search
USPC .............. 382/103, 107, 305; 348/143, 153, 348/154, 159; 707/E17.019, E17.028
See application file for complete search history.

(56) References Cited

U.S. PATENT DOCUMENTS

| 2006/0202998 A1* | 9/2006 | Hirakawa et al. ............ 345/501 |
| 2007/0064975 A1 | 3/2007 | Takanohashi et al. ........ 382/103 |
| 2007/0086622 A1 | 4/2007 | Sun et al. ..................... 382/103 |
| 2007/0299604 A1* | 12/2007 | DiBernardo et al. ......... 701/207 |
| 2008/0243774 A1* | 10/2008 | Jaspers et al. .................... 707/3 |

(Continued)

FOREIGN PATENT DOCUMENTS

| JP | 9-081740 A | 3/1997 |
| JP | 2007-249922 A | 9/1997 |

(Continued)

OTHER PUBLICATIONS

Background Art Information for discussion of Japan Publication No. 2006-350751 dated Aug. 6, 2008 (1 page).

*Primary Examiner* — Andrew W Johns
(74) *Attorney, Agent, or Firm* — Harness, Dickey & Pierce, P.L.C.

(57) ABSTRACT

A trajectory processing apparatus comprises a trajectory database configured to store a position coordinate of a movable body detected from a camera image in association with data that specifies the camera image from which the movable body is detected, and a camera image database configured to store the camera image. A control section fetches the position coordinate of the movable body and the specifying data for the camera image from which the movable body is detected from the trajectory database. Further, the position coordinate of the movable body fetched from the trajectory database is displayed in a display section as a trajectory of the movable body. Furthermore, the control section acquires from the camera image database the camera image specified by the specifying data fetched from the trajectory database. Moreover, this camera image is displayed in the display section.

5 Claims, 16 Drawing Sheets

(56) References Cited

U.S. PATENT DOCUMENTS

| | | | |
|---|---|---|---|
| 2009/0052739 A1* | 2/2009 | Takahashi et al. | 382/103 |
| 2009/0164284 A1 | 6/2009 | Koiso et al. | 705/7 |
| 2009/0296985 A1 | 12/2009 | Lv et al. | 382/103 |

FOREIGN PATENT DOCUMENTS

| | | |
|---|---|---|
| JP | 10-049718 A | 2/1998 |
| JP | 11-066319 A | 3/1999 |
| JP | 11-0663139 A | 3/1999 |
| JP | 11-120482 A | 4/1999 |
| JP | 2003-022309 A | 1/2003 |
| JP | 2003-100471 A | 4/2003 |
| JP | 2003-101999 A | 4/2003 |
| JP | 2003-248832 A | 9/2003 |
| JP | 2005-259173 A | 9/2005 |
| JP | 2005-309951 A | 11/2005 |
| JP | 2006-259018 A | 9/2006 |
| JP | 2006-331340 A | 12/2006 |
| JP | 2006-350751 A | 12/2006 |
| JP | 2007-087208 A | 4/2007 |

* cited by examiner

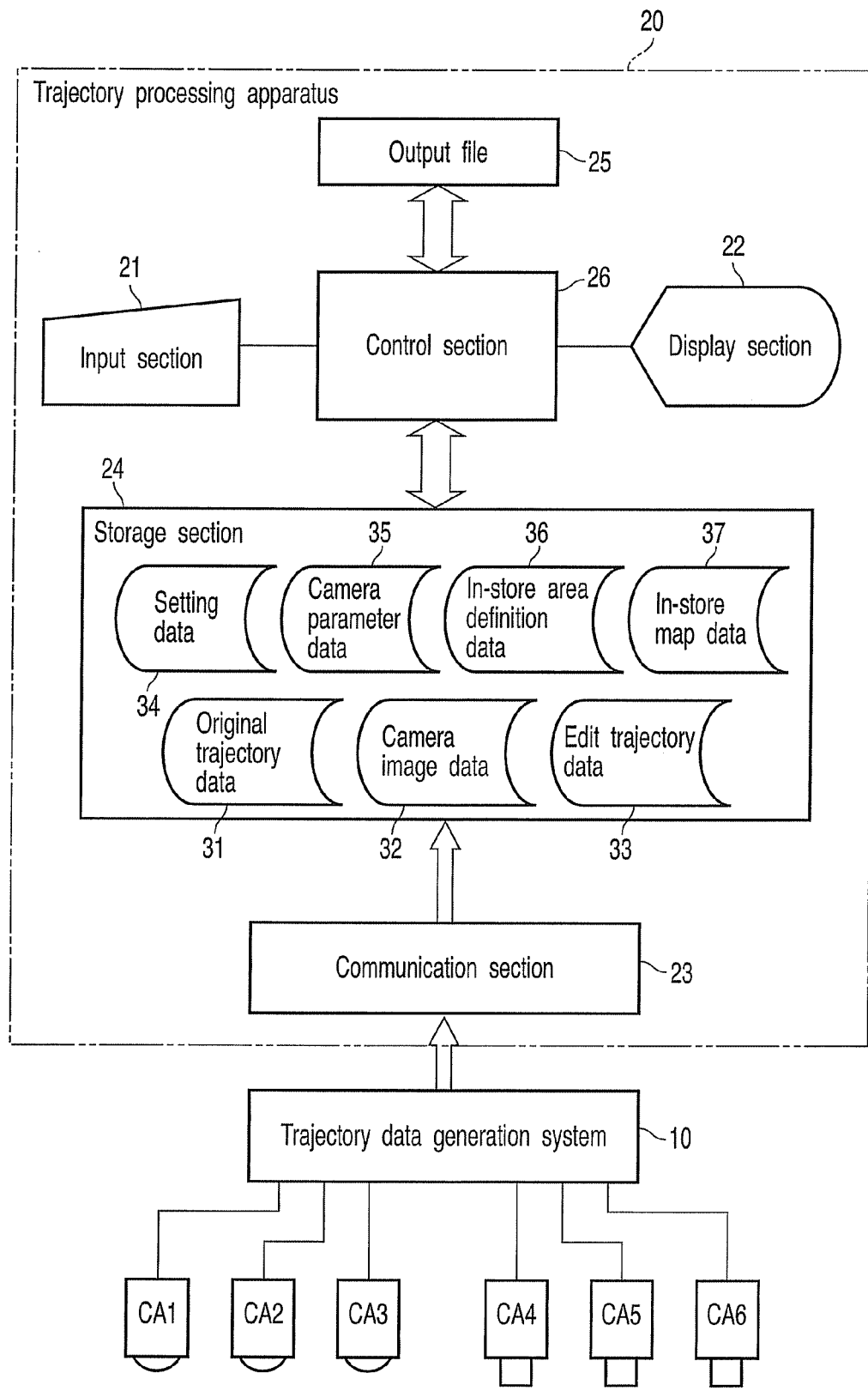
F I G. 1

TRAJECTORY PROCESSING APPARATUS AND METHOD

CROSS-REFERENCE TO RELATED APPLICATIONS

This application is a divisional application of U.S. application Ser. No. 12/215,603 filed Jun. 26, 2008, that is based upon and claims the benefit of priority from prior Japanese Patent Applications No. 2007-170703, filed Jun. 28, 2007; No. 2007-170704, filed Jun. 28, 2007; No. 2007-170705, filed Jun. 28, 2007; No. 2007-170706, filed Jun. 28, 2007; and No. 2007-283727, filed Oct. 31, 2007, the entire contents of all of which are incorporated herein by reference.

BACKGROUND OF THE INVENTION

1. Field of the Invention

The present invention relates to a trajectory processing apparatus and method that process a trajectory indicative of a route of a movable body, e.g., a person who moves in a monitored region.

2. Description of the Related Art

There has been conventionally known a trajectory processing apparatus disclosed in JP-A 2006-350751 (KOKAI). This apparatus has a picture database, a sales information database, a trajectory conversion processing section, and a trajectory database. In the picture database, pictures taken by a plurality of cameras installed in a store are recorded in association with time information. In the sales information database, sales information input from a sales information input device is stored in association with a purchase time. The trajectory conversion processing section fetches a picture recorded in the picture database and executes image processing to this picture to create trajectory data. In the trajectory database, the trajectory data created by the trajectory conversion processing section is recorded.

A person in charge of trajectory analysis specifies sales information from the sales information database. Then, trajectory data in the trajectory database is specified from a purchase time in this sales information. Further, a display shows a trajectory based on this trajectory data. Then, the person in charge of trajectory analysis can analyze the trajectory of a customer.

JP-A 2006-350751 (KOKAI) has a description that an image processing technology for pictures taken by cameras is used to extract a customer, trace the extracted customer, and obtain trajectory data. However, according to the current image processing technology, even if an entire area in a store is shot without blind spots, tracing movement of one customer in the entire region in the store as one trajectory is very difficult. For example, a trajectory is disconnected, or it is counterchanged with a trajectory of another customer. As factors of such an inconvenience, mixture of routes of a customer, a change in person characteristic amounts caused due to a difference between angles for watching the same customer, movement of a customer himself/herself, e.g., raising hands or bending over, and others can be considered. Any countermeasure for the problem that such an inconvenience frequently occurs has not been proposed at all.

BRIEF SUMMARY OF THE INVENTION

A trajectory processing apparatus that can trace movement of one customer in an entire region in a store as one trajectory has been demanded.

According to one aspect of the present invention, there is provided a trajectory processing apparatus comprising: a trajectory database configured to store a position coordinate of a movable body detected from a camera image in association with data that specifies the camera image from which the movable body is detected; a camera image database configured to store the camera image; a data acquisition section configured to fetch the position coordinate of the movable body and the specifying data of the camera image from which the movable body is detected from the trajectory database; a trajectory display section configured to display the position coordinate of the movable body fetched by the data acquisition section as a trajectory of the movable body; a camera image acquisition section configured to acquire a camera image specified by the specifying data fetched by the data acquisition section from the camera image database; and a camera image display section configured to display the camera image acquired by the camera image acquisition section.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a system configuration in an embodiment according to the present invention;

DETAILED DESCRIPTION OF THE INVENTION

Figure 2:
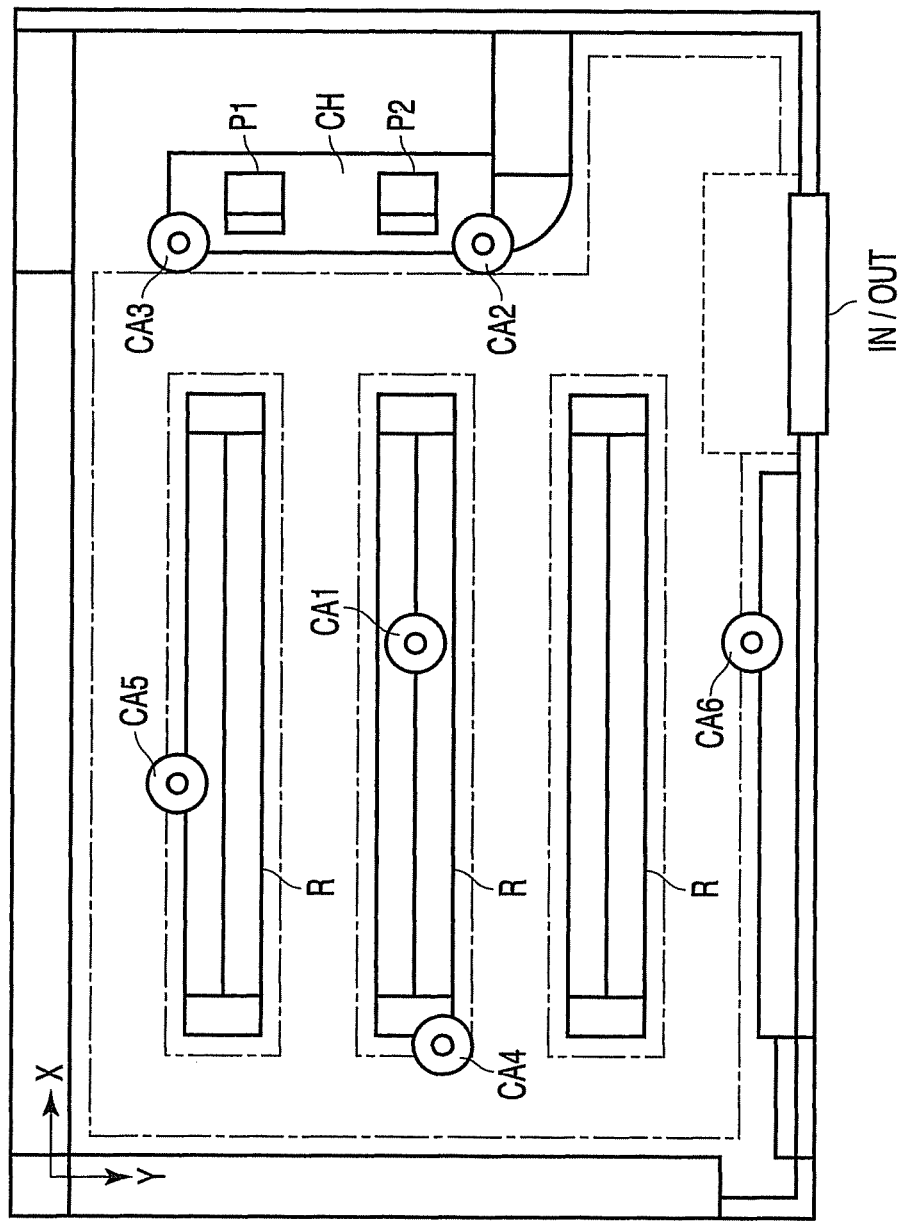
FIG. 2 is an explanatory drawing of an in-store layout in the embodiment.

The best mode for carrying out the present invention will now be explained hereinafter with reference to the accompanying drawings.

First Embodiment

This embodiment includes six cameras CA1 to CA6, a trajectory data generation system 10, and a trajectory processing apparatus 20 as shown in a block diagram of FIG. 1.

In regard to the respective cameras CA, one camera (CA1) is disposed on a ceiling in a central portion in a store, two cameras (CA2 and CA3) are disposed on the ceiling near a checkout counter CH where POS (Point Of Sales) terminals 11a and 11b are placed, and three cameras (CA4, CA5, and CA6) are disposed on the ceiling at three positions on an inner side in the store and right and left wall sides with respect to the checkout counter CH.

Of these cameras, the cameras CA1, CA2, and CA3 are cameras each using a fish-eye lens, i.e., so-called fish-eye cameras, and the cameras CA4, CA5, and CA6 are cameras each having an omnidirectional mirror, i.e., so-called omnidirectional cameras.

It is to be noted that the number of the cameras is not restricted to six, and it may be three to five or seven or above. Further, combinations of the fish-eye cameras and the omnidirectional cameras are not restricted to a pattern in this embodiment, and they can be arbitrarily changed.

The trajectory data generation system 10 extracts camera-specific frame images in a fixed cycle from pictures taken by the respective cameras CA1 to CA6. Furthermore, the extracted camera-specific frame images obtained at the same timing are analyzed. If a movable body is detected as a result, the trajectory data generation system 10 traces this movable body as a target.

The trajectory generation system 10 adds a target ID as an intrinsic identifier to a movable body every time the new movable body is detected. The trajectory data generation system 10 generates original trajectory data in units of frame based on the target ID and information obtained by tracing the movable body.

In this embodiment, the target ID is a serial number which is incremented by one starting from zero for convenience's sake. Moreover, a cycle of extracting each frame image is 1/15 second. This cycle can be changed. For example, when more detailed trajectory data is required, shortening the cycle to, e.g., 1/30 second can suffice. When a file capacity of an original trajectory database 31 must be reduced, increasing the cycle to, e.g., 1/10 second can suffice.

The trajectory processing apparatus 20 includes an input section 21, a display section 22, a communication section 23, a storage section 24, an output file 25, and a control section 26. Such an apparatus is realized by a computer device, e.g., a personal computer.

That is, an input device such as a keyboard or a mouse is used as the input section 21. A display device such as a liquid crystal display or a CRT display is used as the display section 22. The communication section 23 has an interface function for the trajectory data generation system 10. A general communication interface that a computer device has is used as the communication section 23.

The storage section 24 stores various kinds of databases. For example, a hard disk drive is used as the storage section 24. Data processed by the trajectory processing apparatus 20 is output to the output file 25. A recording medium such as a memory card or a magneto optical disk is used as the output file 25.

The control section 26 controls the respective sections, i.e., the input section 21, the display section 22, the communication section 23, the storage section 24, and the output file 25 based on a preset program. A CPU (Central Processing Unit) and a main memory storing a program constitute the control section 26.

The storage section 24 stores an original trajectory database 31, a camera image database 32, an edit trajectory database 33, a setting database 34, a camera parameter database 35, an in-store area definition database 36, and an in-store map database 37.

The original trajectory database 31 stores original trajectory data generated from the camera-specific frame images obtained at the same timing. The original trajectory data is generated by the trajectory data generation system 10. The original trajectory data generated by the trajectory data generation system 10 is taken into the trajectory processing apparatus 20 through the communication section 23 to be stored in the original trajectory database 31.

Figure 3:
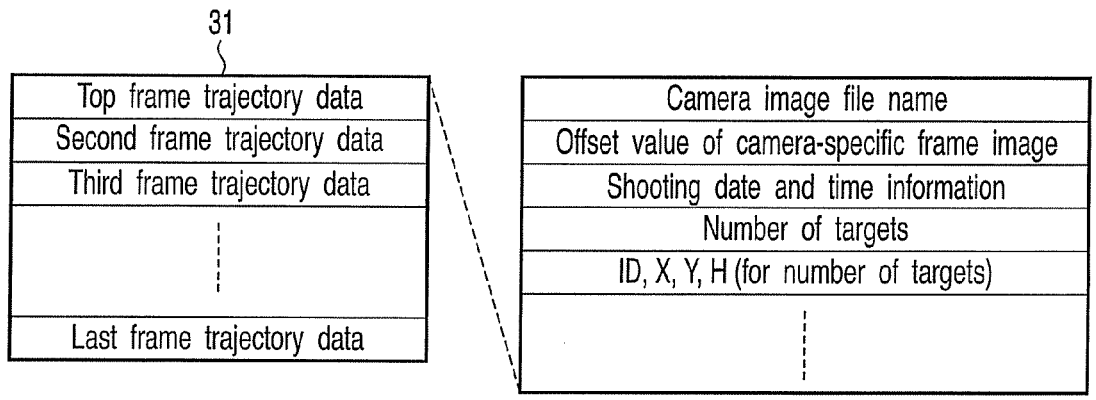
FIG. 3 is a schematic view showing a data configuration of trajectory data in the embodiment.

As shown in FIG. 3, the original trajectory database 31 stores data including original trajectory data generated from a camera-specific frame image of a top frame to original trajectory data generated from a camera-specific frame image of a last frame in order of shooting data and time. The original trajectory data per frame includes a file name of a camera image file, an offset value, shooting date and time information, the number of targets, target information (ID, X, Y, and H) for the number of targets.

Respective frame images extracted at the same time from pictures taken by the respective cameras CA1 to CA6 are stored in one camera image file. At this time, different offset values are given to the respective frame images. A file name of this camera image file and an offset value of each frame image become data that specifies a camera image from which a movable body has been detected. This camera image specifying data is incorporated into original trajectory data generated in accordance with each frame image.

The trajectory data generation system 10 detects a movable body from each frame image. An intrinsic target ID is given to the movable body. Additionally, a position of the movable body is calculated in a three-dimensional world coordinate system (X, Y, H).

In this embodiment, in a plan view of FIG. 2 showing the inside of a store, a corner on the left inner side is determines as an original point (0, 0) of an X axis and a Y axis, and its floor is determined as an original point of an H (Height) axis. The number of the movable bodies detected from the frame images extracted at the same timing, i.e., a so-called number of targets, shooting date and time of each of the frame images, target information of each movable body (ID, X, Y, H) are incorporated in original trajectory data generated in accordance with each frame image.

The camera image database 32 stores a camera image file. The camera image file stores respective frame images extracted at the same hour from pictures taken by the cameras CA1 to CA6 in accordance with each of the cameras CA1 to CA6.

Figure 4:
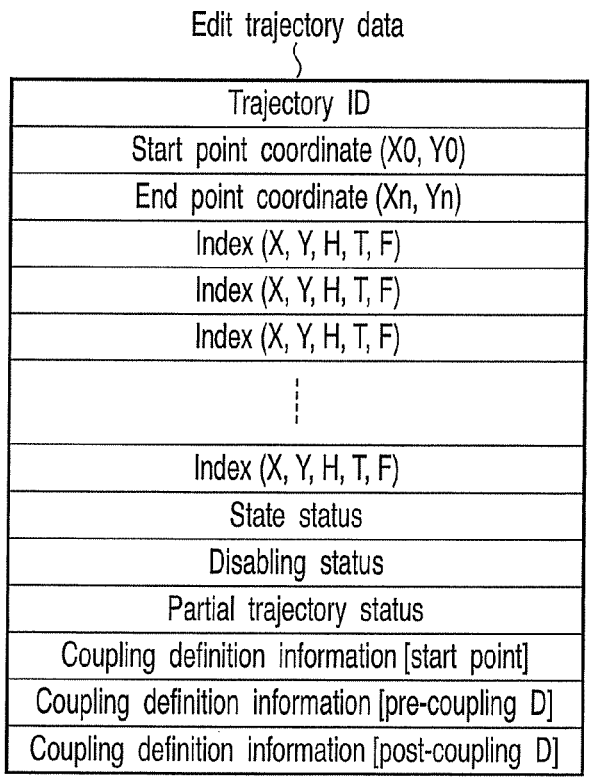
FIG. 4 is a schematic view showing a data configuration of edit trajectory data in the embodiment.

The edit trajectory database 33 stores edit trajectory data. The edit trajectory data is generated based on the original trajectory data in accordance with each movable body. FIG. 4 shows a data configuration of the edit trajectory data. As shown in the drawing, the edit trajectory data includes an intrinsic trajectory ID, a start point coordinate, an end point coordinate, a plurality of pieces of index information, various kinds of status information, and various kinds of coupling definition information.

The start point coordinate is a two-dimensional coordinate (X0, Y0) indicative of a start point of a trajectory specified by a trajectory ID. The end point coordinate is a two-dimensional coordinate (Xn, Yn) indicative of an end point of this trajectory. The index information is generated in accordance with each frame image. One piece of index information includes an in-store coordinate (X, Y, H) of a trajectory specified by a trajectory ID, shooting date and time information T of a frame image, and a change point flag F. There are three types of status information, i.e., a state status, a disabling status, and a partial trajectory status. There are three types of coupling definition information, i.e., start point information, a pre-coupling ID, and a post-coupling ID.

The setting database 34 stores various kinds of setting data required for a trajectory editing operation in advance.

The camera parameter database 35 stores various kinds of parameter data concerning the fish-eye cameras CA1 to CA3 and various kinds of parameter data concerning the omnidirectional cameras CA4 to CA6.

The in-store area definition database 36 stores data required to define an area of the in-store in advance. In this embodiment, the in-store is partitioned into an entrance area, a disabled area, and a sales area.

In FIG. 2, the entrance area is a rectangular area surrounded by a broken line on the in-store side from an entrance/exit IN/OUT. A two-dimensional coordinate (X, Y) of this entrance area is stored as entrance area definition data in the in-store area definition database 36.

The disabled area is an area where customers cannot walk around for shopping. In FIG. 2, areas where store shelves R are installed and an inner area of the checkout counter CH correspond to the disabled area. A two-dimensional coordinate (X, Y) in this disabled area is stored as disabled area definition data in the in-store area definition database 36.

The sales area is an area where customers walk around for shopping. An area obtained by eliminating the entrance area and the disabled area from the inside of the shop corresponds to the sales area. A two-dimensional coordinate (X, Y) in this sales area is stored as sales area definition data in the in-store area definition database 36.

The in-store map database 37 stores image data of an in-store map which is similar to the in-stores plan view depicted in FIG. 2 in advance.

The store shelves R and others are placed in the store. Therefore, a movable body may be hidden behind the shelf so that the movable body cannot be traced as a target in the middle of a process in some cases. Further, a plurality of movable bodies may overlap so that the movable body cannot be traced as a target. When tracing the movable body once becomes impossible, in the trajectory data generation system 10, another trajectory ID is given to manage the movable body even if the movable body is the same person.

The trajectory processing apparatus 20 has a function of extracting a plurality of pieces of trajectory data generated with respect to the same person and editing a complete trajectory connecting a line at the moment that this person enters the store to a line at the moment that he/she exits the store. This function is realized by a trajectory editing program.

Figure 6:
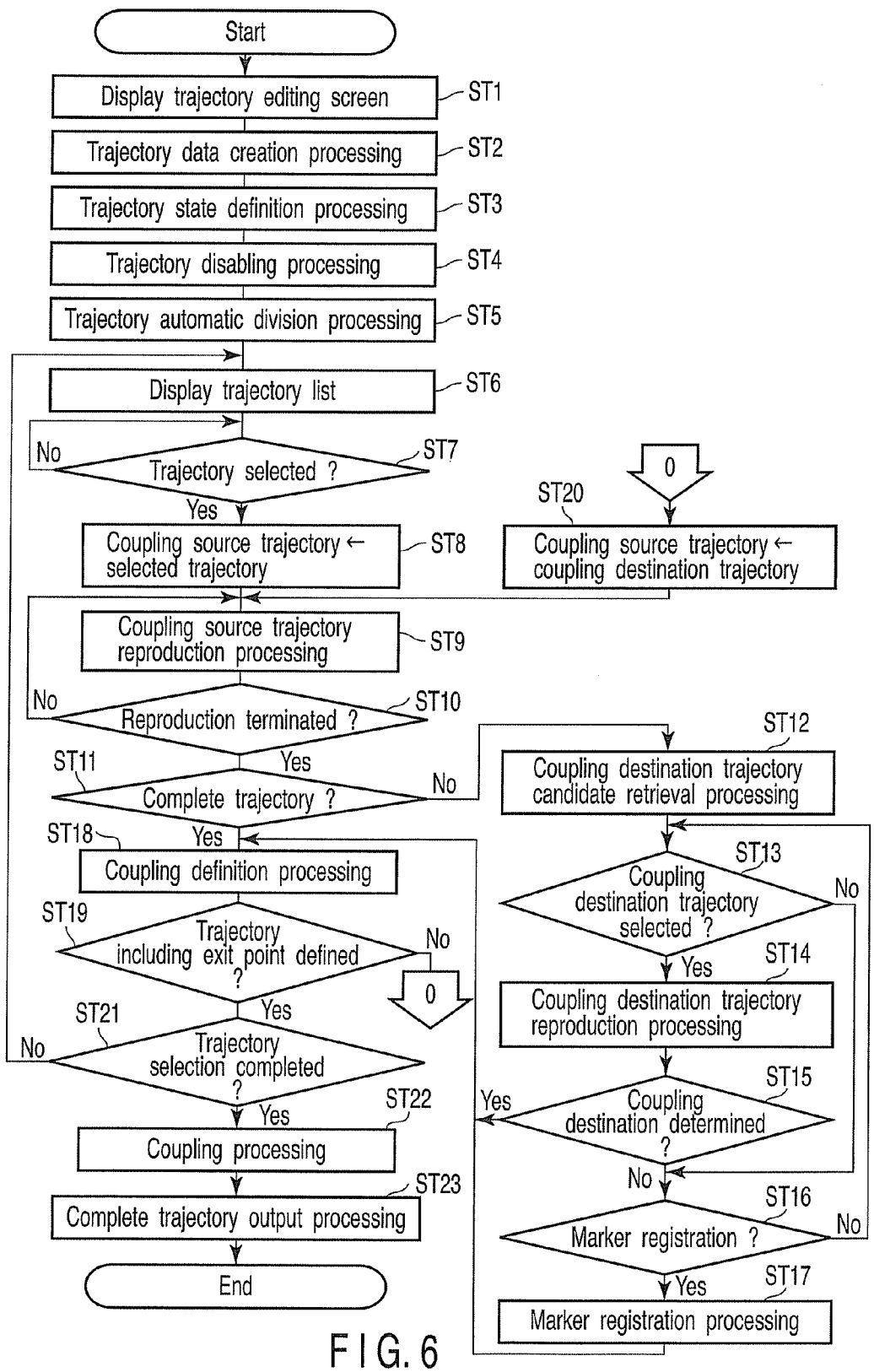
FIG. 6 is a flowchart showing a processing procedure of a trajectory processing apparatus executed by a trajectory editing program in the embodiment.

When an operator operates the input section 21 to instruct starting a trajectory editing operation, the trajectory editing program is activated. When the trajectory editing program is activated, the control section 26 appropriately accesses the respective databases 31 to 37 in the storage section 24 in accordance with the trajectory editing program, thereby executing the following trajectory editing processing. A flowchart of FIG. 6 shows a procedure of this processing.

Figure 5:
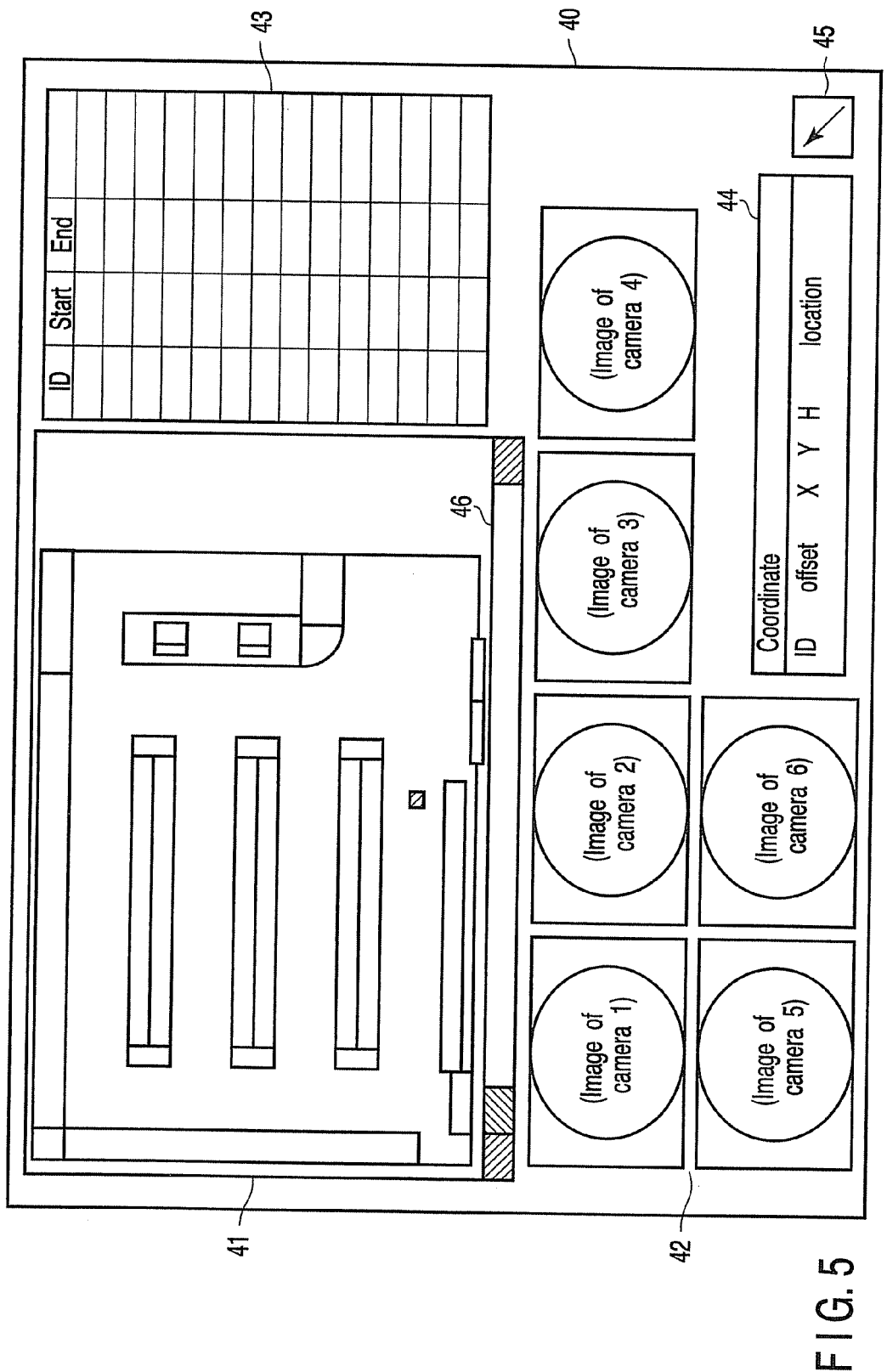
FIG. 5 is a schematic view showing an example of a trajectory editing screen in the embodiment.

The control section 26 displays a trajectory editing screen 40 in the display section 22 in step 1. FIG. 5 shows an example of the trajectory editing screen 40. As shown in the drawing, the trajectory editing screen 40 is partitioned into a trajectory display section 41, a camera image display section 42, a traffic list display section 43, and a coordinate display section 44. Further, an icon 45 for marker registration is displayed.

The trajectory display section 41 shows a plan view of an in-store map based on image data stored in the in-store map database 37. A scroll bar 46 is provided in the trajectory display section 41. The scroll bar 46 is synchronized with a shooting time of each of the cameras CA1 to CA6. When the operator slides the scroll bar 46 from a left end toward a right end in the screen, a shooting time passes. Furthermore, a coordinate of a movable body detected from frame images shot by the respective cameras CA1 to CA6 is superimposed and displayed on the in-store map as a trajectory.

The camera image display section 42 shows images shot by the respective cameras CA1 to CA6 within a time specified by the scroll bar 46. As shown in the drawing, images of the six cameras CA1 to CA6 can be simultaneously displayed in alignment. Moreover, one or more camera images selected from these images can be expanded to be displayed.

Figure 7:
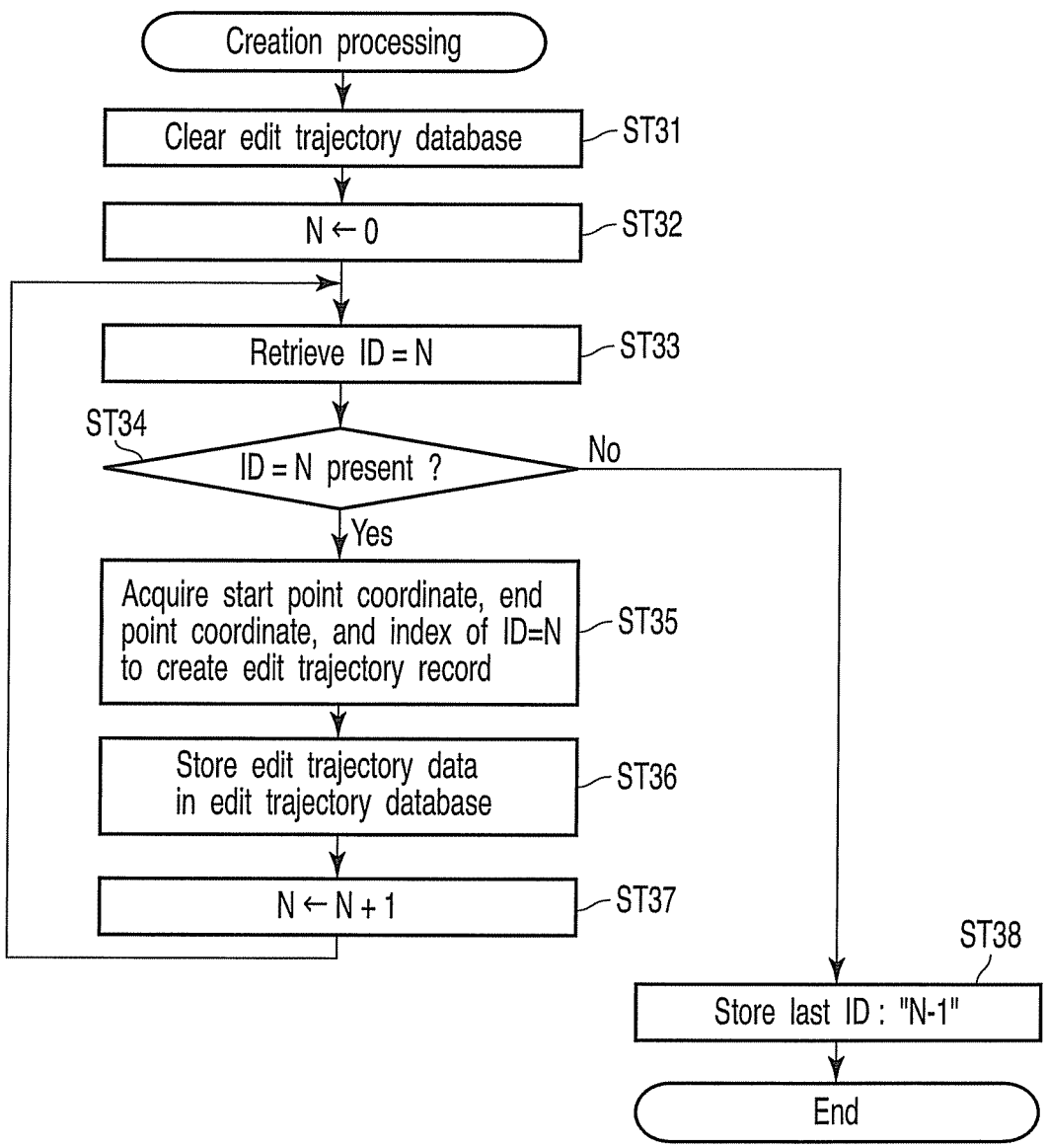
FIG. 7 is a flowchart showing a primary processing procedure of trajectory edit data creation processing depicted in FIG. 6.

After displaying the trajectory editing screen 40, the control section 26 executes trajectory data creation processing in step 2. A flowchart of FIG. 7 shows a processing procedure of this creation processing.

First, the control section 26 clears the edit trajectory database 33 in step 31. Then, the control section 26 presets a count value N in a number counter to zero in step 32. This preset value zero is an initial value of a target ID that is given every time a new movable body is detected in the trajectory data creation system 10.

After presetting the count value N of the number counter to zero, the control section 26 retrieves original trajectory data having target information in which a target ID is N (N is a value of the number counter) from the original trajectory database 31 in step 33.

When one or more pieces of relevant original trajectory data can be detected (YES in step 34), the control section 26 generates edit trajectory data having the target ID N as a trajectory ID in step 35. Additionally, a start point coordinate (X0, Y0), an end point coordinate (Xn, Yn), and index information (X, Y, H, T, F) are incorporated into this edit trajectory data.

That is, the control section 26 acquires target information having the target ID N from all the pieces of original trajectory data detected from the original trajectory database 31. Further, a two-dimensional coordinate (X, Y) of target information acquired from original trajectory data having the oldest shooting date and time is incorporated as the start point coordinate (X0, Y0) of the edit trajectory data. Furthermore, a two-dimensional coordinate (X, Y) of target information acquired from original trajectory data having the latest shooting date and time is incorporated as the end point coordinate (Xn, Yn) of the edit trajectory data. Moreover, a three-dimensional coordinate (X, Y, H) and shooting date and time information T of target information acquired from each original trajectory data are incorporated as index information of the edit trajectory data in chronological order of shooting date and time. It is to be noted that the change point flag F of each index information is reset.

When the edit trajectory data having a trajectory ID N is created, the control section 26 stores this edit trajectory data in the edit trajectory database 33 in step 36. Then, the control section 26 increments the number counter by 1 in step 37. Additionally, the processing of steps 33 to 37 is again executed.

The control section 26 repeats the processing of steps 33 to 37 while the original trajectory data having the target information (ID, X, Y, H) with the target ID N can be detected from the original trajectory database 31. As a result, edit trajectory data in which a value of the trajectory ID is incremented by 1 is generated based on the original trajectory data in the original trajectory database 31 and stored in the edit trajectory database 33.

When the original trajectory data having the target information with the target ID N cannot be detected from the original trajectory database 31 at all in step 34, the control section 26 stores a value N−1 obtained by subtracting 1 from the count value N of the number counter in the storage section 24 as a last trajectory ID in step 38. Then, the trajectory data creation processing is terminated.

Figure 8:
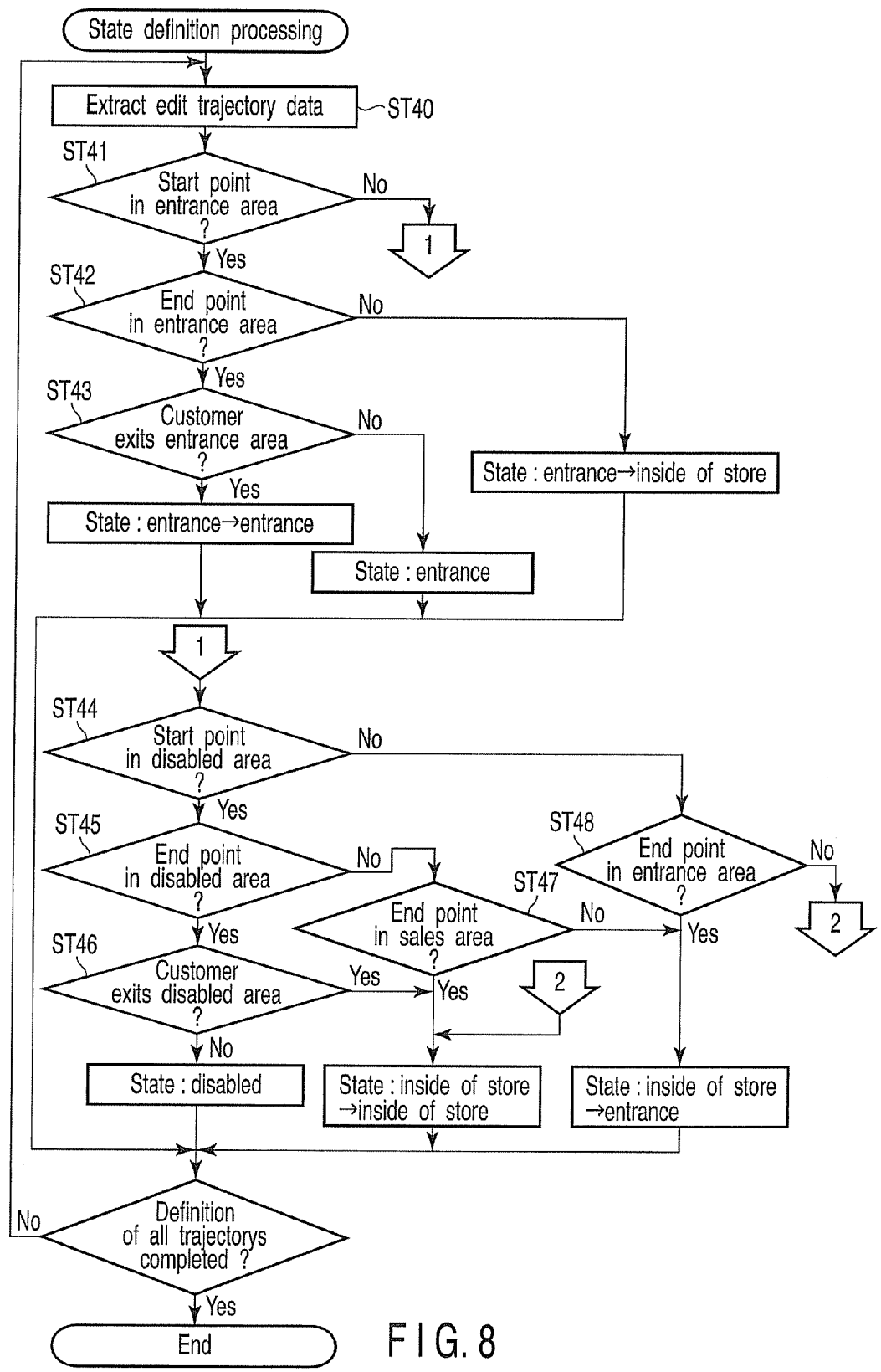
FIG. 8 is a flowchart showing a primary processing procedure of trajectory state definition processing depicted in FIG. 6.

When the trajectory data creation processing is terminated, the control section 26 subsequently executes state definition processing of the trajectory in step 3. A flowchart of FIG. 8 shows a processing procedure of this state definition processing.

The control section 26 extracts the respective pieces of edit trajectory data one by one from the edit trajectory database 33 in, e.g., ascending order of the trajectory IDs in step 40. Further, the control section 26 sets a state status with respect to each extracted edit trajectory data in accordance with the following processing routine.

First, the control section 26 acquires a start point coordinate (X0, Y0) from the edit trajectory data in step 41. Further, the control section 26 makes reference to the in-store area definition database 36 to judge whether this start point coordinate (X0, Y0) is a coordinate defined as the entrance area. If it is the coordinate of the entrance area, the control section 26 acquires an end point coordinate (Xn, Yn) from the edit trajectory data in step 42. Furthermore, the control section 26 makes reference to the in-store area definition database 36 to judge whether this end point coordinate (Xn, Yn) is also a coordinate in the entrance area.

If the end point coordinate (Xn, Yn) is also the coordinate of the entrance area, the control section 26 checks index information of the edit trajectory data in chronological order of shooting date and time. As a result, when the index information including a coordinate other than the coordinate in the entrance area is detected, a movable body corresponding to this edit trajectory data has once exited the entrance area and then returned to the entrance area. In this case, the control section 26 sets the state status to "entrance→entrance".

When the index information including a coordinate other than the coordinate in the entrance area is not detected at all in step 43, a movable body corresponding to this edit trajectory data has not exited the entrance area. In this case, the control section 26 sets the state status to "entrance".

When the end point coordinate (Xn, Yn) is not the coordinate in the entrance area in step 42, the end point coordinate (Xn, Yn) is defined as the sales area or the disabled area. In this case, the control section 26 sets the state status to "entrance→inside of store".

When the start point coordinate (X0, Y0) is not the coordinate in the entrance area in step 41, the control section 26 judges whether this start point coordinate (X0, Y0) is a coordinate defined as the disabled area in step 44. When it is the coordinate in the disabled area, the control section 26 acquires the end point coordinate (Xn, Yn) from the edit trajectory data in step 45. Moreover, the control section 26 makes reference to the in-store area definition database 36 to judge whether this end point coordinate (Xn, Yn) is a coordinate in the disabled area.

When the end point coordinate (Xn, Yn) is the coordinate in the disabled area, the control section 26 checks index information of the edit trajectory data in chronological order of shooting date and time in step 46. As a result, when the index information including a coordinate other than the coordinate in the disabled area is not detected at all, a movable body corresponding to this edit trajectory data has not exited the disabled area. In this case, the control section 26 sets the state status to "disabled".

When the index information including the coordinate other than the coordinate in the disabled area in step 46, a movable body corresponding to this edit trajectory data has once exited the disabled area and returned to the disabled area. In this case, the control section 26 sets the state status to "inside of store→inside of store".

When the end point coordinate (Xn, Yn) is not the coordinate in the disabled area in step 45, the control section 26 makes reference to the in-store area definition database 36 to judge whether this end point coordinate (Xn, Yn) is a coordinate in the sales area in step 47.

When the end point coordinate (Xn, Yn) is the coordinate in the sales area, the control section 26 sets the state status to "inside of store-inside of store". On the other hand, when the end point coordinate (Xn, Yn) is not the coordinate in the sales area, the end point coordinate (Xn, Yn) is a coordinate in the entrance area. In this case, the control section 26 sets the state status to "inside of store→entrance".

When the start point coordinate (X0, Y0) is not the coordinate in the disabled area in step 44, the start point coordinate (X0, Y0) is a coordinate in the sales area. In this case, the control section 26 acquires the end point coordinate (Xn, Yn) from the edit trajectory data. Additionally, the control section 26 makes reference to the in-store area definition database 36 to judge whether this end point coordinate (Xn, Yn) is a coordinate in the entrance area in step 48.

When the end point coordinate (Xn, Yn) is the coordinate in the entrance area, the control section 26 sets the state status to "inside of store→entrance". On the other hand, when the end point coordinate (Xn, Yn) is not the coordinate in the entrance area, the end point coordinate (Xn, Yn) is a coordinate in the sales area or the disabled area. In this case, the control section 26 sets the state status to "inside of store→inside of store".

The control section 26 executes the above-explained processing routine with respect to all the pieces of edit trajectory data stored in the edit trajectory database 33. Therefore, any one of the state statuses, i.e., "entrance→entrance", "entrance", "entrance→inside of store", "inside of store→entrance", "inside of store→inside of store", and "disabled" is set with respect to each edit trajectory data. Here, the control section 26 constitutes a trajectory defining section.

Figure 9:
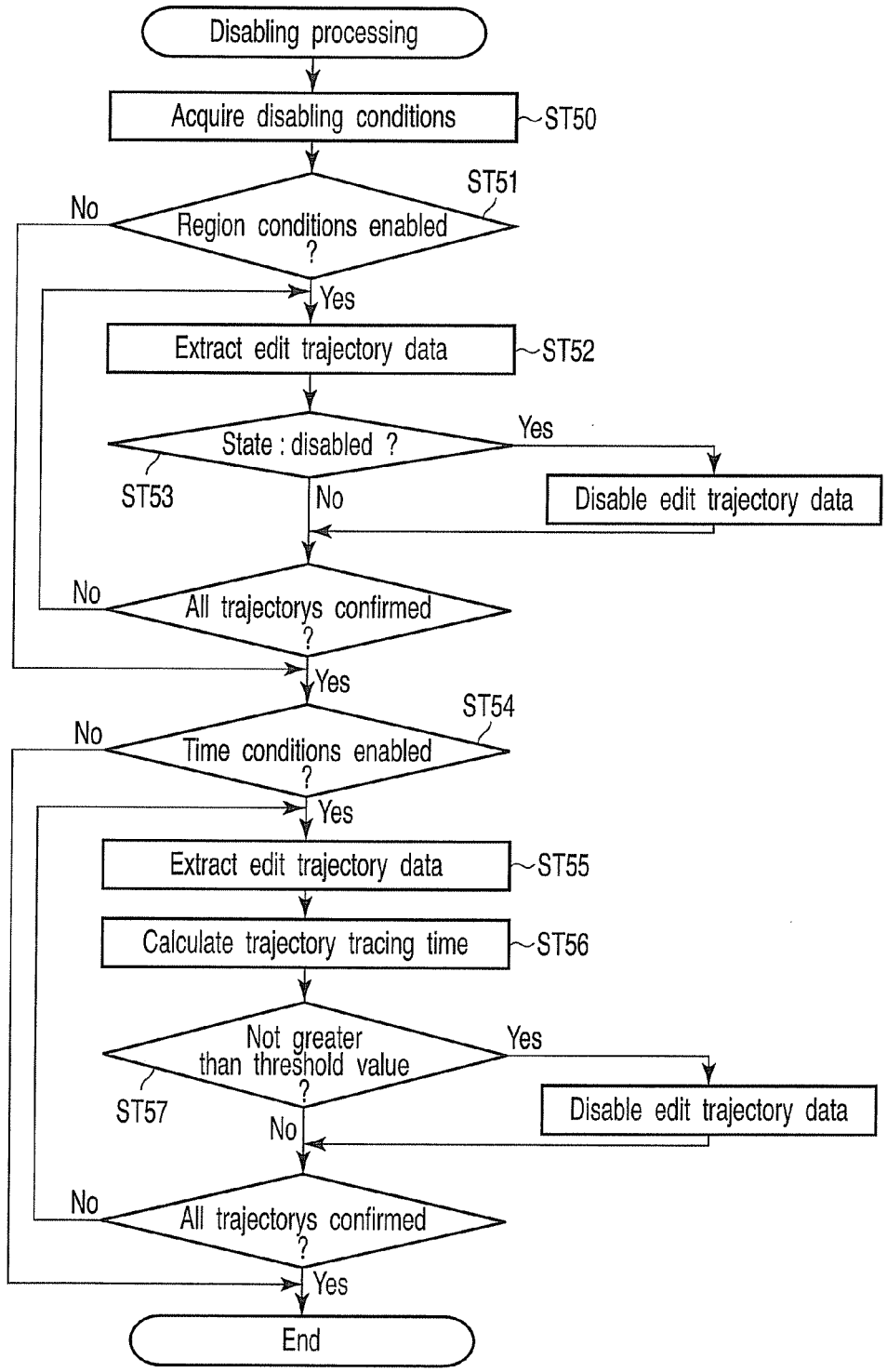
FIG. 9 is a flowchart showing a primary processing procedure of trajectory disabling processing depicted in FIG. 6.

When the state definition processing for the trajectory is terminated, the control section 26 subsequently executes disabling processing for the trajectory in step 4. A flowchart of FIG. 9 shows a processing procedure of this disabling processing.

The control section 26 acquires setting data of disabling conditions from the setting database 34 in step 50. As the disabling conditions, there are region conditions and time conditions. The region conditions disable a trajectory data whose starting position (a start point) or ending position (an end point) is present in the disabled area. The time conditions disable a trajectory data whose tracing time for a trajectory is less than or equal to a preset threshold value. Whether these conditions are enabled is set in accordance with respective conditions by an operator in advance. The setting database 34 as a judgment condition storage section stores setting data of the disabling conditions.

The control section 26 that has acquired the setting data of the disabling conditions first judges whether the region conditions are enabled in step 51. When the region conditions are not enabled, the control section 26 advances to processing in step 54.

When the region conditions are enabled, the control section 26 extracts respective pieces of edit trajectory data one by one from the edit trajectory database 33 in step 52, and checks state statuses of these pieces of data (a judgment section). When the state status of each data is "disabled" (YES in step 53), the control section 26 sets a disabling status of this edit trajectory data to ON (a disabling processing section). When the state status is not "disabled" (NO in step 53), the disabling status remains OFF. The edit trajectory data having the disabling status changed to ON is disabled. The disabled edit trajectory data is not processed in a procedure of subsequent editing processing.

When checking the state statuses of all the pieces of edit trajectory data in the edit trajectory database 33 is terminated, the control section 26 advances to processing of step 54. That is, the control section 26 judges whether the time conditions are enabled. When the time conditions are not enabled, the disabling processing is terminated.

When the time conditions are enabled, the control section 26 extracts respective pieces of edit trajectory data one by one from the edit trajectory database 33 in step 55. Further, the control section 26 calculates a trajectory tracing time in step 56. That is, the control section 26 calculates an elapsed time from shooting date and time information T of top index information of the edit trajectory data to shooting date and time information T of last index information of the same (a time calculating section).

Then, the control section 26 compares this trajectory tracing time with a preset threshold value in step 57 (a comparison section). The threshold value is set in the setting database 34 by an operator in advance. The control section 26 judges whether the trajectory tracing time is less than or equal to the threshold value (the judgment section).

When the trajectory tracing time is less than or equal to the threshold value (YES in step 57), the control section 26 sets a disabling status of this edit trajectory data to ON (the disabling processing section). When the trajectory tracing time is longer than the threshold value (NO in step 57), the disabling status remains OFF.

When checking the trajectory tracing times of all the pieces of edit trajectory data in the edit trajectory database 33 is terminated, the disabling processing is terminated.

Figure 10:
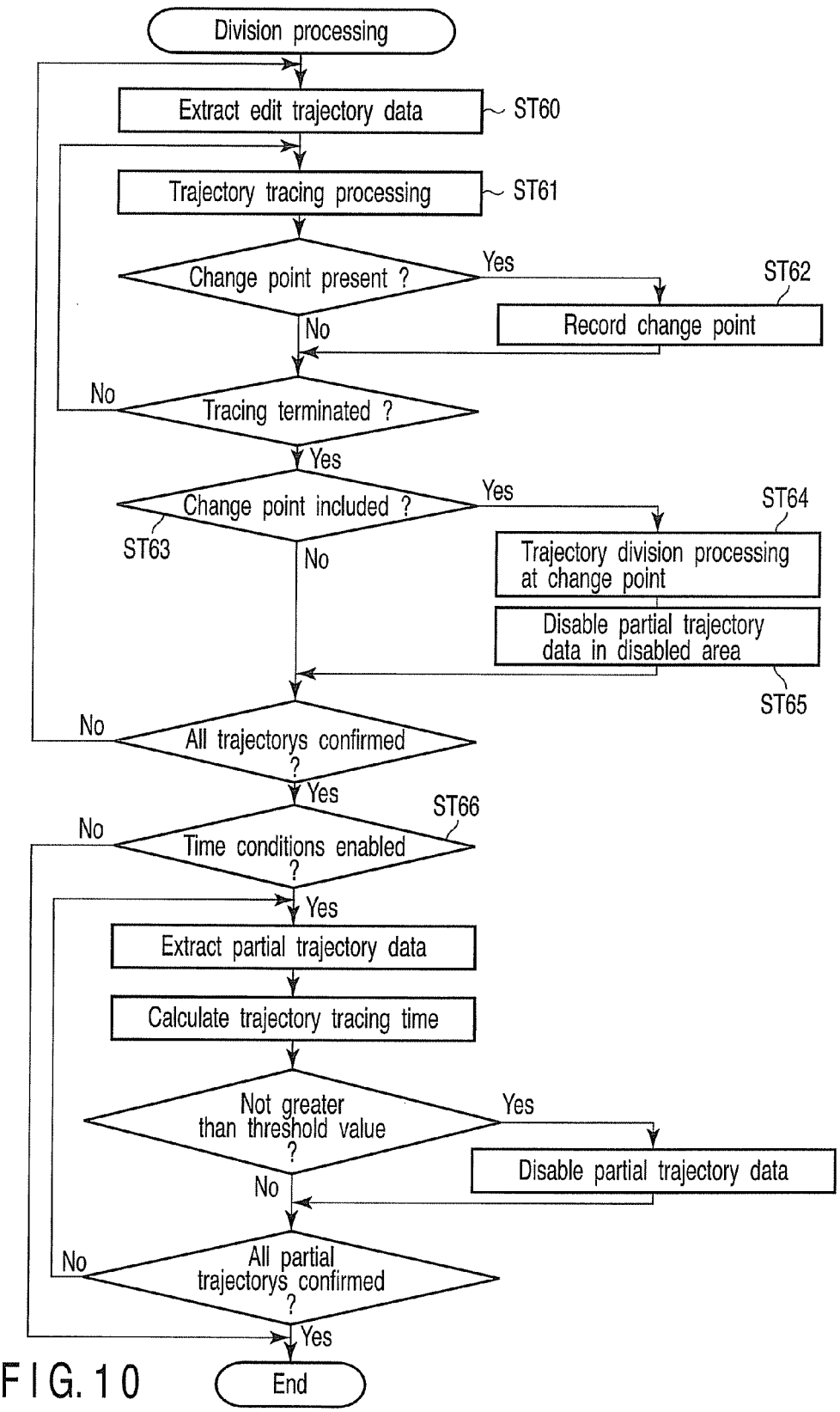
FIG. 10 is a flowchart showing a primary processing procedure of trajectory separation processing depicted in FIG. 6.

When the trajectory disabling processing is terminated, the control section 26 then executes division processing for the trajectory in step 5. A flowchart of FIG. 10 shows a processing procedure of this division processing.

The control section 26 extracts respective pieces of edit trajectory data each having the disabling status not set to ON one by one from the edit trajectory database 33 in step 60. Furthermore, the control section 26 executes the division processing with respect to each extracted edit trajectory data in accordance with the following processing routine.

First, the control section 26 executes trajectory tracing processing in step 61. That is, the control section 26 acquires index information from the edit trajectory data in chronological order of shooting date and time. Moreover, the control section 26 collates a three-dimensional coordinate (X, Y, H) of each index information with a coordinate in each area defined in the in-store area definition database 36 to detect index information having a coordinate in the disabled area changed from a coordinate in the entrance area or the sales area every time the index information is acquired. Alternatively, the control section detects index information having a coordinate in the entrance area or the sales area changed from a coordinate in the disabled area. When corresponding index information is detected, the control section 26 sets a change point flag F with respect to this index information in step 62. In this manner, a change point is recorded in the edit trajectory data (a change point extraction section).

Then, the control section 26 judges whether the change point has been recorded in the edit trajectory data in step 63. When index information having the change point flag set thereto is present, the change point has been recorded. In this case, the control section 26 executes trajectory division processing at this change point in step 64. This division processing is executed based on the following procedure.

First, the control section 26 adds a copy of the edit trajectory data to the edit trajectory database 33. Subsequently, the control section 26 adds 1 to the last trajectory ID. The last trajectory ID is stored in the storage section 24 in step 38 of the trajectory data creation processing. The control section 26 determines the last trajectory ID as a trajectory ID of the copied edit trajectory data (which will be referred to as a copy destination trajectory data hereinafter).

Subsequently, the control section 26 sequentially checks index information of the copy destination trajectory data from the top. Furthermore, when index information having the change point flag set thereto is detected, the top index information to index information immediately before the index information having the change point flag set thereto are deleted. As a result, the index information having the change point flag set thereto becomes the top index information of the copy destination trajectory data. The control section 26 resets the change point flag of this top index information. Moreover, a two-dimensional coordinate (X, Y) of the top index information is determined as a start point coordinate (X0, Y0) of the copy destination trajectory data.

Then, the control section 26 executes the same processing as the state definition processing with respect to the copy destination trajectory data to redefine the state status of the copy destination trajectory data. When the state definition processing is terminated, the control section 26 sets a partial trajectory status of the copy destination trajectory data to ON. That is, the copy destination trajectory data is defined as partial trajectory data.

The control section 26 executes the following processing with respect to the edit trajectory data as a copy source (which will be referred to as copy source trajectory data hereinafter).

First, the control section 26 sequentially checks index information of the copy source trajectory data from the top. Moreover, if index information having the change point flag set thereto is detected, all the pieces of index information following this index information are deleted. Then, the control section 26 determines a two-dimensional coordinate of index information having the latest shooting date and time in the remaining pieces of index information after deletion as an end point coordinate (Xn, Yn) of the copy source trajectory data.

Subsequently, the control section 26 executes the same processing as the state definition processing with respect to the copy source trajectory data to redefine the state status of the copy source trajectory data. When the state definition processing is terminated, the control section 26 sets the partial trajectory status of the copy source trajectory data to ON. That is, the copy source trajectory data is defined as partial trajectory data.

With the above-described processing, the edit trajectory data having the change point is divided into the partial trajectory data before the change point (the copy source trajectory data) and the partial trajectory data after the change point (the copy destination trajectory data).

Then, the control section 26 judges whether the copy destination trajectory data has a further change point. Moreover, when the copy destination trajectory data has a further change point, the above-explained trajectory division processing is again executed.

Thereafter, the control section 26 repeats the trajectory division processing until the copy destination trajectory data no longer has a change point. Thus, the edit trajectory data having the change point is divided into a plurality of pieces of partial trajectory data having no change point (a partial trajectory generating section).

When the trajectory division processing is terminated, the control section 26 disables the partial trajectory data in the disabled area from the respective pieces of partial trajectory data in step 65. That is, the control section 26 checks the state status of each partial trajectory data (the judgment section). Additionally, when the partial trajectory data having the state status set to "disabled" is detected, the disabling status of this partial trajectory data is set to ON.

When the respective pieces of processing of steps 61 to 65 have been executed with respect to all the pieces of edit trajectory data extracted from the edit trajectory database 33, the control section 26 judges whether the time conditions are enabled as the disabling conditions in step 66. When the time conditions are not enabled, this division processing is terminated.

When the time conditions are enabled, the control section 26 extracts respective pieces of partial trajectory data each having the disabling status not set to ON one by one from the edit trajectory database 33. Further, the control section 26 executes the disabling processing for the time conditions with respect to each extracted partial trajectory data. That is, the control section 26 calculates a trajectory tracing time of the partial trajectory data. Furthermore, the control section 26 judges whether the trajectory tracing time is less than or equal to a threshold value. When the trajectory tracing time is less than or equal to the threshold value, the control section 26 sets the disabling status of this partial trajectory data to ON.

When the above-explained processing is executed with respect to all the pieces of partial trajectory data extracted from the edit trajectory database 33, the division processing for the trajectory is terminated.

When the division processing is executed, defining information of each non-disabled edit trajectory data stored in the edit trajectory database 33 is set to any one of "entrance", "entrance→entrance", "entrance→inside of store", "inside of store→inside of store", and "inside of store→entrance".

When the division processing for trajectory is terminated. the control section 26 extracts all pieces of enabled edit trajectory data each having the disabling status not set to ON from the edit trajectory database 33 in step 6. Furthermore, the control section 26 creates a trajectory list showing trajectory IDs, start point coordinates, and end point coordinates of the respective pieces of extracted edit trajectory data. The trajectory list is displayed in the trajectory list display section 43.

Then, the control section 26 waits until a coupling source trajectory data is selected from the trajectory list in step 7 (a first trajectory selecting section).

An operator manipulates the input section 21 to select an ID of a trajectory as a coupling source trajectory data from the trajectory list. When the trajectory ID is selected, the control section 26 stores this selected trajectory ID as an ID of the coupling source trajectory in step 8.

Figure 11:
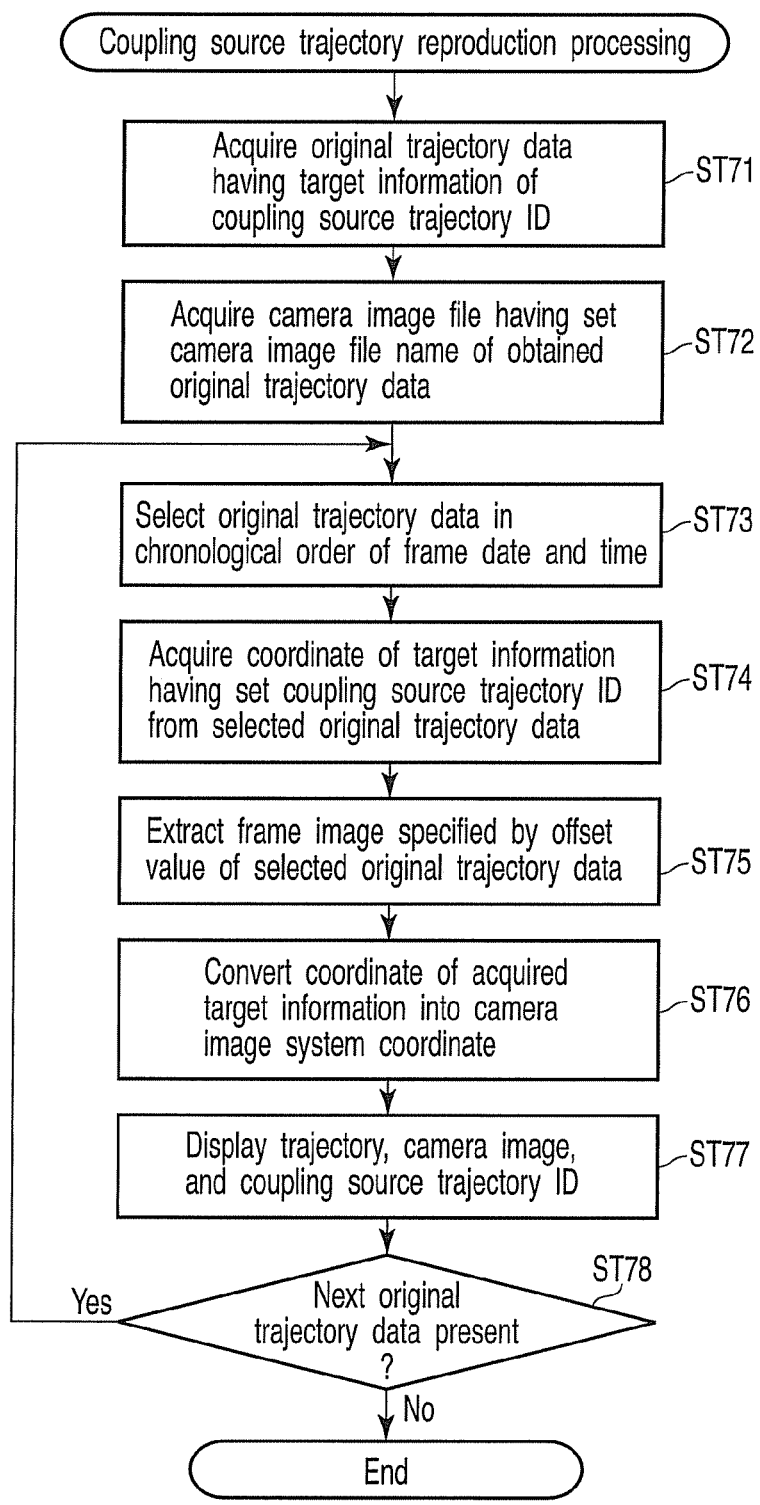
FIG. 11 is a flowchart showing a primary processing procedure of a coupling source trajectory reproduction processing depicted in FIG. 6.

Subsequently, the control section 26 executes coupling source trajectory reproduction processing in step 9. A flowchart of FIG. 11 shows a processing procedure of this reproduction processing.

First, the control section 26 sequentially searches the original trajectory database 31 starting from original trajectory data in a top frame in step 71. Further, the control section 26 acquires all pieces of original trajectory data each having target information in which a target ID matches with the coupling source trajectory ID (a data acquisition section).

Then, the control section 26 acquires a camera image file name from each acquired original trajectory data in step 72. Furthermore, the control section 26 acquires all camera image files to which this file name is set from the camera image database 32 (a camera image acquisition section).

Subsequently, the control section 26 compares shooting date and time information of the respective pieces of acquired original trajectory data in step 73. Moreover, it selects the original trajectory data in chronological order of shooting date and time information and executes the following processing.

First, the control section 26 acquires a three-dimensional coordinate (X, Y, H) of target information whose target ID matches with the coupling source trajectory ID from the selected original trajectory data in step 74. This three-dimensional coordinate is in a world coordinate system.

Figure 12:
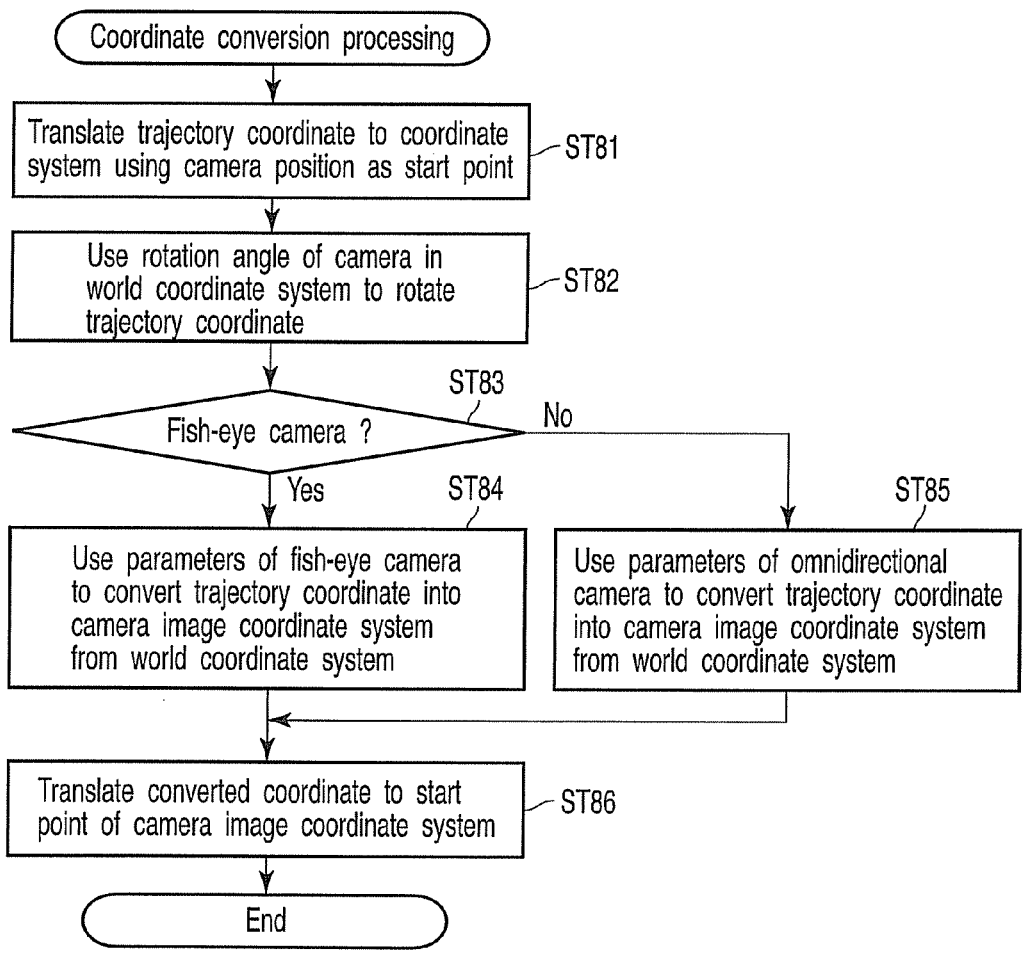
FIG. 12 is a flowchart showing a primary processing procedure of a coordinate conversion processing depicted in FIG. 11.

Then, the control section 26 extracts a frame image specified by an offset value of the selected original trajectory data from the camera image files in step 75. Additionally, the control section 26 converts the acquired three-dimensional coordinate in the world coordinate system into a three-dimensional coordinate in a camera image system in step 76 (a coordinate conversion section). This conversion processing is executed based on a procedure depicted in a flowchart of FIG. 12 in accordance with each of the cameras CA1 to CA6.

It is to be noted that this conversion processing uses the following parameters previously set in the camera parameter database 35.

A trajectory coordinate in the world coordinate system: x, y, h

A position of a camera in the world coordinate system: Wx, Wy, Wz

A coordinate of the center of an image: Cx, Cy

A camera rotation angle around a coordinate axis in the world coordinate system: Rx, Ry, Rz Parameters of the omnidirectional camera: b, c, f Parameters of the fish-eye camera: k1, k3, k5, scale First, the control section 26 translates a trajectory coordinate (x, y, h) of a conversion target to a coordinate system (X0, Y0, Z0) using a camera position as an original point in step 81. This processing is executed based on the following arithmetic expression (1)

$$\begin{pmatrix} X0 \\ Y0 \\ Z0 \end{pmatrix} = \begin{pmatrix} x \\ y \\ h \end{pmatrix} - \begin{pmatrix} Wx \\ Wy \\ Wz \end{pmatrix} \quad (1)$$

Then, the control section 26 rotates the translated trajectory coordinate (X0, Y0, Z0) by using a camera rotation angle around the coordinate axis in the world coordinate system to match axes of the world coordinate system and the camera coordinate system with each other in step 82. This processing is executed based on the following arithmetic expressions (2) to (4)

[Rotation Around X Axis]

$$\begin{pmatrix} Xx \\ Yx \\ Zx \end{pmatrix} = \begin{pmatrix} 1 & 0 & 0 \\ 0 & \cos Rx & -\sin Rx \\ 0 & \sin Rx & \cos Rx \end{pmatrix} \begin{pmatrix} X0 \\ Y0 \\ Z0 \end{pmatrix} \quad (2)$$

[Rotation Around Y Axis]

$$\begin{pmatrix} Xy \\ Yy \\ Zy \end{pmatrix} = \begin{pmatrix} \cos Ry & 0 & \sin Ry \\ 0 & 1 & 0 \\ -\sin Ry & 0 & \cos Ry \end{pmatrix} \begin{pmatrix} Xx \\ Yx \\ Zx \end{pmatrix} \quad (3)$$

[Rotation Around Z Axis]

$$\begin{pmatrix} Xz \\ Yz \\ Zz \end{pmatrix} = \begin{pmatrix} \cos Rz & -\sin Rz & 0 \\ \sin Rz & \cos Rz & 0 \\ 0 & 0 & 1 \end{pmatrix} \begin{pmatrix} Xy \\ Yy \\ Zx \end{pmatrix} \quad (4)$$

Subsequently, the control section 26 determines a type of a camera as a processing target in step 83. In regard to each of the fish-eye cameras CA1, CA2, and CA3, parameters of the fish-eye camera are used to convert a trajectory coordinate (Xz, Yz, Zz) from the world coordinate system into a camera image coordinate system in step 84. This processing is executed based on the following calculations (5) to (7).

First, Xd=r cos t: Yd=r sin t is assumed.

In this expression, when Yz≧0, the following expression is achieved:

$$t = \arccos\left(\frac{Xz}{\sqrt{Xz^2 + Yz^2}}\right) \quad (5)$$

When Yz<0, the following expression is achieved:

$$t = 360° - \arccos\left(\frac{Xz}{\sqrt{Xz^2 + Yz^2}}\right) \quad (6)$$

Here, a value of r is obtained by using a Newton method in the following expression (7).

$$\begin{cases} r_{n+1} = r_n - \dfrac{f(r_n) - \theta}{f'(r_n)} \\ f(r_n) = (k_1 r_n + k_3 r_n^3 + k_5 r_n^5) \times \text{scale} \\ f'(r_n) = (k_1 + 3k_3 r_n^2 + 5k_5 r_n^4) \times \text{scale} \\ R = \sqrt{Xn^2 + Yz^2} \\ \text{When } Zz = 0, \theta = 90° \\ \text{When } Zz < 0, \theta = \arccos\left(\dfrac{-R}{Zz}\right) \\ \text{When } Zz > 0, \theta = 180° - \arccos\left(\dfrac{R}{Zz}\right) \end{cases} \quad (7)$$

It is to be noted that, in this expression (7), an initial value $r_0$ is 0.0, and a target value is θ. Furthermore, it is considered that convergence is attained when $|r_{n+1} - r_n| < 0.01$. A value of r at this moment is used.

On the other hand, in regard to each of the omnidirectional cameras CA4, CA5, and CA6, the parameters of the omnidirectional camera are used to convert the trajectory coordinate (Xz, Yz, Zz) from the world coordinate system into the camera image coordinate system in step 85. This processing is executed based on the following arithmetic expression (8).

$$\begin{cases} Xd = \dfrac{Xzf(b^2 - c^2)}{(b^2 + c^2)(Zz - c) - 2bc\sqrt{Xz^2 + Yz^2 + (Zz - c)^2}} \\ Yd = \dfrac{Yzf(b^2 - c^2)}{(b^2 + c^2)(Zz - c) - 2bc\sqrt{Xz^2 + Yz^2 + (Zz - c)^2}} \end{cases} \quad (8)$$

When the trajectory coordinate is converted into the camera image coordinate system from the world coordinate system in this manner, the control section 26 translates a converted coordinate (Xd, Yd) to an original point of the camera image coordinate system in step 86. This processing is executed by the following arithmetic expression (9).

$$\begin{pmatrix} X \\ Y \end{pmatrix} = \begin{pmatrix} Xd \\ Yd \end{pmatrix} + \begin{pmatrix} Cx \\ Cy \end{pmatrix} \quad (9)$$

When the respective pieces of processing of steps 81 to 86 are executed, the three-dimensional coordinate of the target information acquired from the selected original trajectory data is converted into the coordinate in the camera image system of each of the cameras CA1 to CA6.

When the three-dimensional coordinate, the frame image, and the camera image system coordinate are acquired, the control section 26 displays a trajectory in the trajectory display section 41 in the trajectory editing screen 40 based on the three-dimensional coordinate in step 77. At the same time, the control section 26 also displays the frame image in the camera image display section 42. Further, it displays the coupling source traffic ID in the camera image display section 42 based on the camera image system coordinate (a display control section).

Thereafter, the control section 26 judges whether original trajectory data having the second oldest shooting date and time has been acquired from the original trajectory database 31 in step 78. When the corresponding original trajectory data has been acquired, the control section 26 executes the respective pieces of processing of steps 74 to 78 with respect to this original trajectory data. When the original trajectory data has not been acquired, this reproduction processing is terminated.

When the coupling source trajectory reproduction processing is executed, a trajectory selected by an operator from the trajectory list is displayed in the trajectory display section 41 of the trajectory editing screen 40. Furthermore, the camera image display section 42 displays camera images at the same time point in synchronization with the trajectory. Moreover, the trajectory ID is given to a movable body and displayed in each camera image.

Therefore, comparing movement of the trajectory with the camera images enables the operator to readily confirm whether this trajectory traces one customer. Additionally, when the trajectory is disconnected in the middle of process, whether a trajectory tracing movement of a customer after disconnection is present can be easily confirmed.

When a trajectory tracing movement of the customer after disconnection has been confirmed, coupling this trajectory with the trajectory before disconnection as one trajectory enables creating a complete trajectory of one customer. Thus, this coupling operation will now be explained.

It is to be noted that the defining information of enabled edit trajectory data stored in the edit trajectory database 33 corresponds to one of "entrance", "entrance→entrance", "entrance→inside of store", "inside of store→inside of store", and "inside of store→entrance". Among others, each edit trajectory data whose defining information is set to "entrance→entrance" or "entrance" corresponds to a complete trajectory tracing a route from entering the store to exiting the store. Furthermore, since the edit trajectory data whose defining information is set to "inside of store→entrance" is data indicative of exiting the store, it can be a coupling destination trajectory but cannot be a coupling source trajectory.

When the coupling source trajectory reproduction processing is terminated (YES in step 10), the control section 26 judges whether this reproduced coupling source trajectory is a complete trajectory in step 11. Specifically, the control section 26 searches the edit trajectory database 33 to acquire edit trajectory data having a coupling source trajectory ID as a trajectory ID.

Moreover, a state status of this edit trajectory data is checked. Here, when the state status is "entrance→entrance" or "entrance", this trajectory can be regarded as the complete trajectory. When any other state status is set, this data can be regarded as an incomplete trajectory. In case of the complete trajectory, the control section 26 proceeds to coupling definition processing in step 18.

Figure 13:
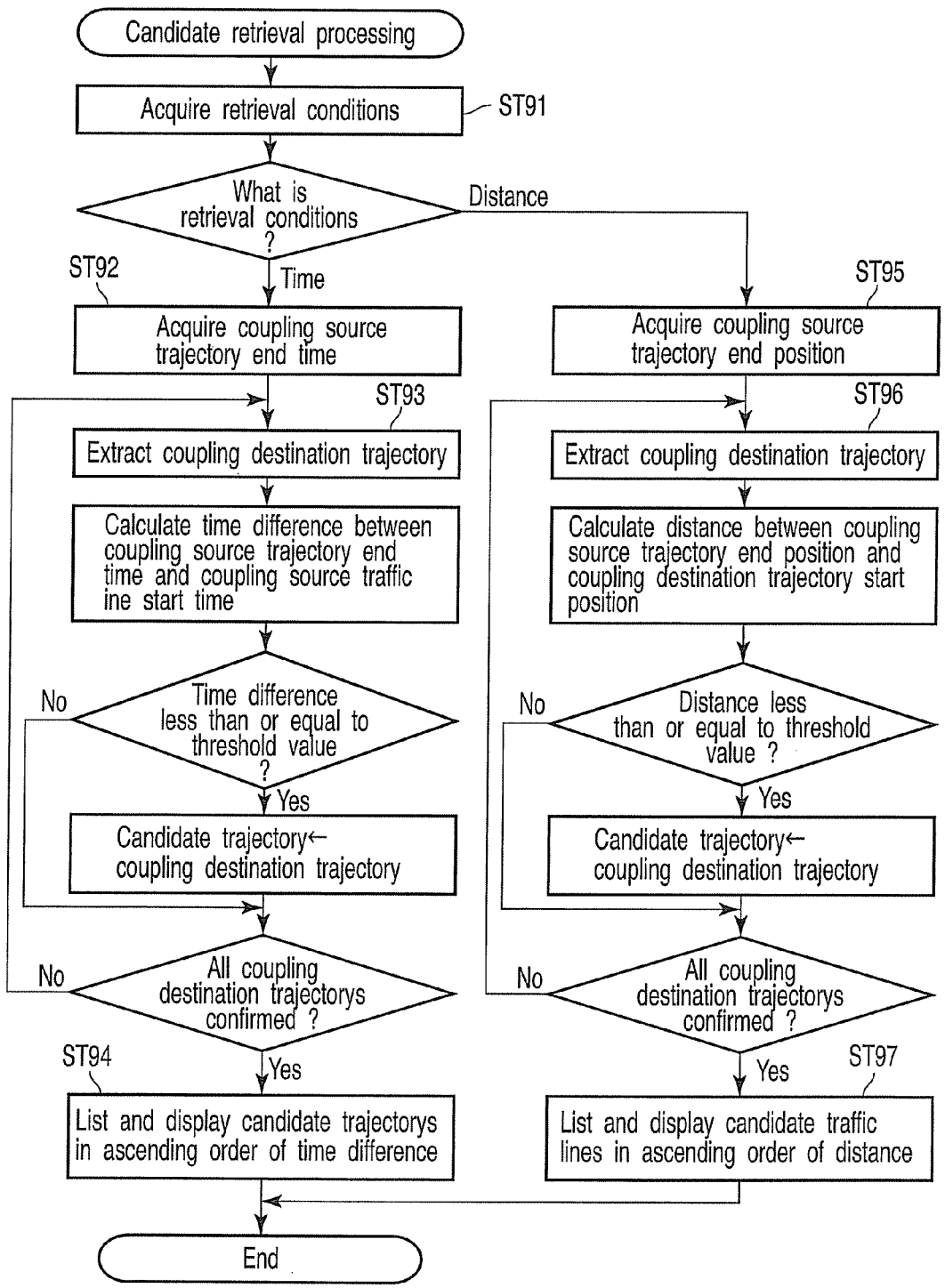
FIG. 13 is a flowchart showing a primary processing procedure of coupling destination trajectory candidate retrieval processing depicted in FIG. 6.

In case of the incomplete trajectory, the control section 26 executes coupling destination trajectory candidate retrieval processing in step 12. A flowchart of FIG. 13 shows a processing procedure of this retrieval processing.

The control section 26 acquires retrieval conditions from the setting database 34 in step 91. As the retrieval conditions, there are "time" and "distance", and one of them is set.

When "time" is set as the retrieval conditions, the control section 26 acquires an end time of a coupling destination trajectory in step 92. That is, it acquires as the end time shooting date and time of index information associated with the last frame from the edit trajectory data having the coupling source trajectory ID as a trajectory ID (an end time acquisition section).

Then, the control section 26 searches the edit trajectory database 33 to extract edit trajectory data as a candidate for the coupling destination trajectory in step 93. Edit trajectory data whose state status is set to "entrance→inside of store", "inside of store→inside of store", or "inside of store→entrance" is a candidate for the coupling destination trajectory. When the edit trajectory data as a candidate for the coupling destination trajectory is extracted, the control section 26 acquires shooting date and time of index information associated with the top frame as start date and time of the coupling destination trajectory. Further, a time difference between the start time of the coupling destination trajectory and the end time of the coupling source trajectory is calculated (a time difference calculating section).

When the time difference is calculated, the control section 26 judges whether the time difference is less than or equal to a preset threshold value. When the time difference is less than or equal to the threshold value, this edit trajectory data is left as a coupling destination candidate trajectory (a candidate extraction section). When the time difference exceeds the threshold value, this edit trajectory data is eliminated as the coupling destination candidate.

When the above-explained processing has been executed with respect to all the pieces of edit trajectory data extracted from the edit trajectory database 33, the control section 26 creates a coupling destination candidate list in step 94. This list includes trajectory IDs, start point coordinates, and end point coordinates of respective pieces of edit trajectory data remaining as coupling target candidates. The trajectory IDs, the start point coordinates, and the end point coordinates are aligned in the list in ascending order of time difference. The coupling destination candidate list is displayed in the trajectory list display section 43.

When "distance" is set as the retrieval conditions, the control section 26 acquires an end position of the coupling source trajectory in step 96. That is, the control section 26 acquires an end point coordinate from the edit trajectory data having the coupling source trajectory ID as the trajectory ID (an end point position detection section).

Then, the control section 26 searches the edit trajectory database 33 to extract edit trajectory data as a candidate for the coupling destination trajectory in step 96. When the edit trajectory data as a candidate for the coupling destination trajectory is extracted, the control section 26 acquires a start point coordinate of this data as a start point of the coupling destination trajectory. Moreover, a distance between the start point of this coupling destination trajectory and the trajectory end point coordinate of the coupling source trajectory is calculated (a distance calculating section). When the distance is calculated, the control section 26 judges whether this distance is equal to or smaller than a preset threshold value. When the distance is equal to or smaller than the threshold value, this edit trajectory data is left as a coupling destination candidate trajectory (the candidate extraction section). When the distance exceeds the threshold value, this edit trajectory data is eliminated as the coupling destination candidate.

When the processing in step 96 and subsequent steps has been executed with respect to all the pieces of edit trajectory data extracted from the edit trajectory database 33, the control section 26 creates a coupling destination candidate list in step 97. This list includes trajectory IDs, start point coordinates, and end point coordinates of respective pieces of edit trajectory data remaining as coupling destination candidates. In the list, the trajectory IDs, the start point coordinates, and the end point coordinates are aligned in ascending order of distance. The coupling destination candidate list is displayed in the trajectory list display section 43.

When the coupling destination candidate retrieval processing is terminated, the control section 26 waits for a coupling destination trajectory to be selected from the coupling destination candidate list in step 13 (a second trajectory selecting section).

An operator manipulates the input section 21 to select an ID of a trajectory as a coupling destination trajectory from the coupling destination candidate list. When the trajectory ID is selected, the control section 26 executes coupling destination trajectory reproduction processing in step 14. A processing procedure of this reproduction processing is the same as that of the coupling source trajectory reproduction processing depicted in FIG. 11 except target trajectory data. Therefore, an explanation thereof will be omitted.

When the coupling destination trajectory reproduction processing is executed, the trajectory display section 41 in the trajectory editing screen 40 displays a trajectory selected from the coupling destination candidate list by the operator. Further, the camera image display section 42 displays camera images obtained at the same time point in synchronization with the trajectory. Furthermore, a trajectory ID is displayed in each camera image at a position of a movable body.

Thus, the operator compares movement of the coupling destination trajectory with the camera images to confirm whether this coupling destination trajectory is a trajectory that is to be coupled with the previously selected coupling source trajectory. As a result, when the coupling destination trajectory is a trajectory of a person specified by the ID of the coupling source trajectory and is coupled with the coupling source trajectory, the operator manipulates the input section 21 to instruct coupling. When coupling is not performed, the operator operates the input section 21 to instruct avoiding coupling.

The control section 26 judges whether the coupling destination trajectory is to be coupled with the coupling source trajectory in step 15. When performing coupling is instructed, the control section 26 advances to coupling definition processing of step 18. On the other hand, when avoiding coupling is instructed, the control section 26 proceeds to marker registration judgment processing of step 16. Moreover, when a trajectory has not been listed as a coupling destination candidate in the processing in step 13, the control section 26 likewise advances to the marker registration judgment processing of step 16.

In step 16, the control section 26 judges whether marker registration has been declared. When marker registration has not been declared, the control section 26 returns to step 13 and waits until the next coupling destination candidate is selected.

Figure 14:
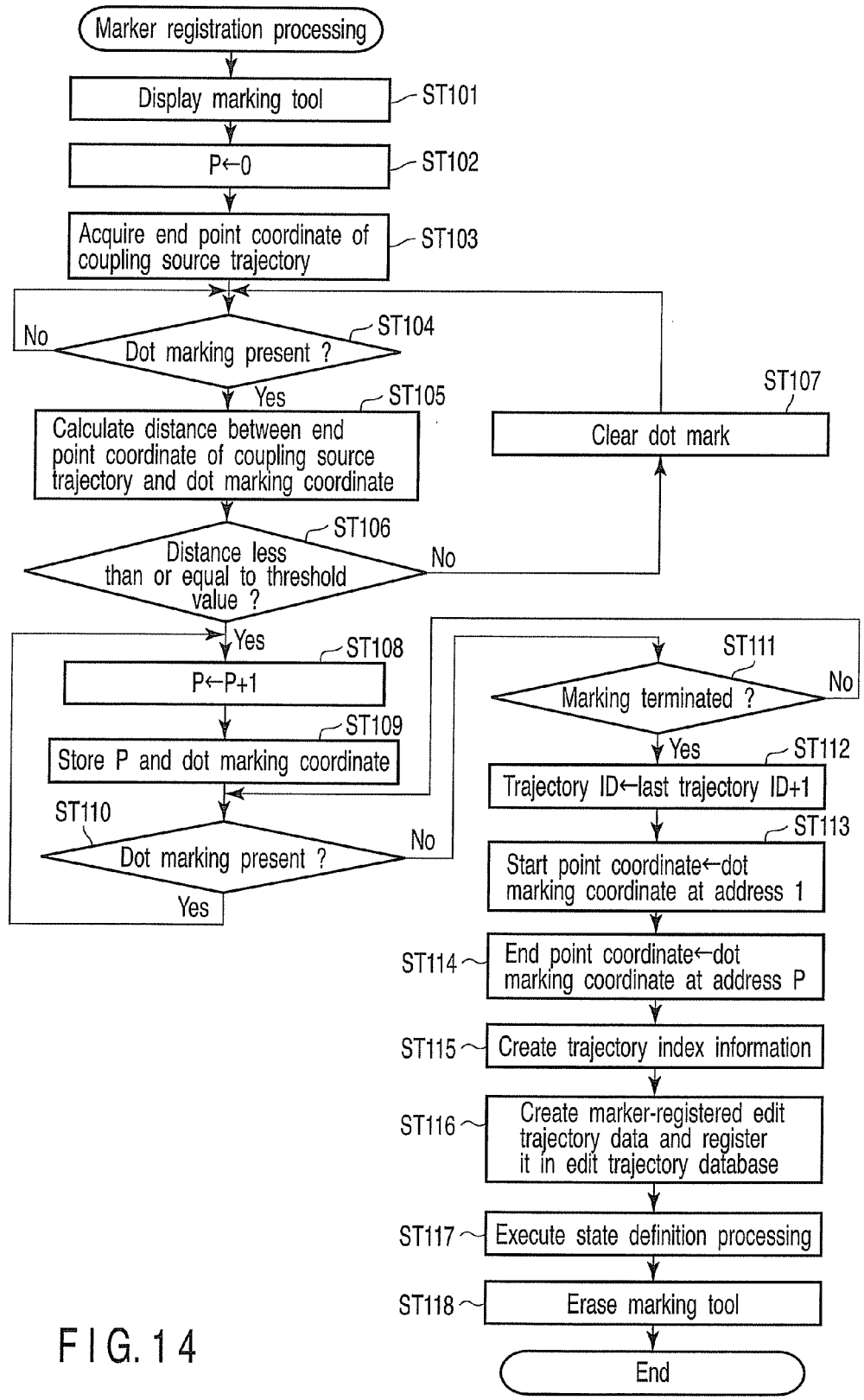
FIG. 14 is a flowchart showing a primary processing procedure of marker registration processing depicted in FIG. 6.

When a user creates a trajectory as a coupling destination candidate for himself/herself, he/she clicks the marker registration icon 45 to declare marker registration. When the marker registration icon 45 is clicked, the control section 26 determines that marker registration has been declared in step 16. In this case, the control section 26 executes marker registration processing in step 17. A flowchart of FIG. 14 shows a processing procedure of this marker registration processing.

The control section 26 displays a dot marking tool in the trajectory display section 41 in the trajectory editing screen 40 in step 101. Additionally, it also resets a marking number counter P to zero in step 102. Further, the control section 26 acquires an end point coordinate (Xn, Yn) from edit trajectory data having the coupling source trajectory ID as a trajectory ID in step 103.

Then, the control section 26 waits for a dot to be marked in the trajectory display section 41 in step 104 (a trajectory input acceptance section). The operator operates the tool to mark the dot at a position that becomes a start point of a trajectory as a coupling destination candidate in the trajectory display section 41.

When the dot is marked, the control section 26 acquires an in-store coordinate (x, y) of this dot in step 105. Furthermore, it calculates a distance between this in-store coordinate (x, y) and an end coordinate (Xn, Yn) of the coupling source trajectory.

Subsequently, the control section 26 judges whether this distance is equal to or smaller than a threshold value used by candidate retrieval processing in step 106. When the distance exceeds the threshold value, the control section 26 clears the marked dot in step 107. Moreover, the control section 26 returns to step 104 and waits until a dot is again marked.

When the distance is equal to or smaller than the threshold value in step 106, the control section 26 increments the marking number counter P by 1 in step 108. Additionally, a value of this marking number counter P is determined as an address and an in-store coordinate (x1, y1) of the marked dot is stored in association with this address in step 109.

Then, the control section 26 waits for the next dot to be marked until termination of marking is instructed in step 110. Further, the control section 26 repeats the processing of steps 108 and 109 every time the next dot is marked (YES in step 110). That is, the marking number counter P is incremented by 1, and a value of this marking number counter P is determined as an address to store an in-store coordinate (xp, yp) of each marked dot.

When the dots has been marked to reach a position of an end point of the trajectory as the coupling destination candidate, the operator manipulates the input section 21 to instruct termination of marking. When termination of the marking is instructed (YES in step 111), the control section 26 adds 1 to a final trajectory ID in step 112. Furthermore, in step 113, the in-store coordinate (x1, y1) stored in association with the address=1 is determined as a start point coordinate. Moreover, in step 114, the in-store coordinate (xp, yp) stored in association with the address P is determined as an end point coordinate. Additionally, in step 115, trajectory index information is created from the respective in-store coordinates stored in association with the respective addresses 1 to P. In this case, a height H is a preset fixed value (e.g., 160 cm). Shooting date and time information T of a frame image is determined to have a value set in the last trajectory index information of edit trajectory data having the set coupling source trajectory ID.

The control section 26 creates edit trajectory data in which a final trajectory ID, the start point coordinate, the end point coordinate, and each trajectory index information are set in step 116 (a trajectory generating section). The edit trajectory data is registered in the edit trajectory database 33 (a trajectory registering section).

Thereafter, the control section 26 executes the state definition processing with respect to this registered edit trajectory data in step 117. When the state definition processing is terminated, the control section 26 erases the marking tool in step 118. Then, the marker registration processing is terminated.

It is to be noted that, when the scroll bar 46 in the trajectory display section 41 is manually operated through the input section 21, camera images obtained at a shooting date and time determined by a position of this scroll bar 46 are displayed in the camera image display section 42.

Then, the operator operates the scroll bar 46 to forward or reverse the camera images. As a result, movement of a customer specified by the trajectory ID of the coupling source trajectory can be confirmed. However, when the customer is hidden behind the store shelf, his/her movement cannot be traced. In this case, the operator specifies a section where tracing has failed. Further, a trajectory corresponding to movement of the customer in this section is created in the trajectory display section 42 based on dot marking. Then, edit trajectory data of this trajectory is registered in the edit trajectory database 33. This edit trajectory data is determined as a coupling destination trajectory with respect to the coupling source trajectory. Therefore, the control section 26 advances to coupling definition processing in step 18 when the marker registration processing is terminated.

Figure 15:
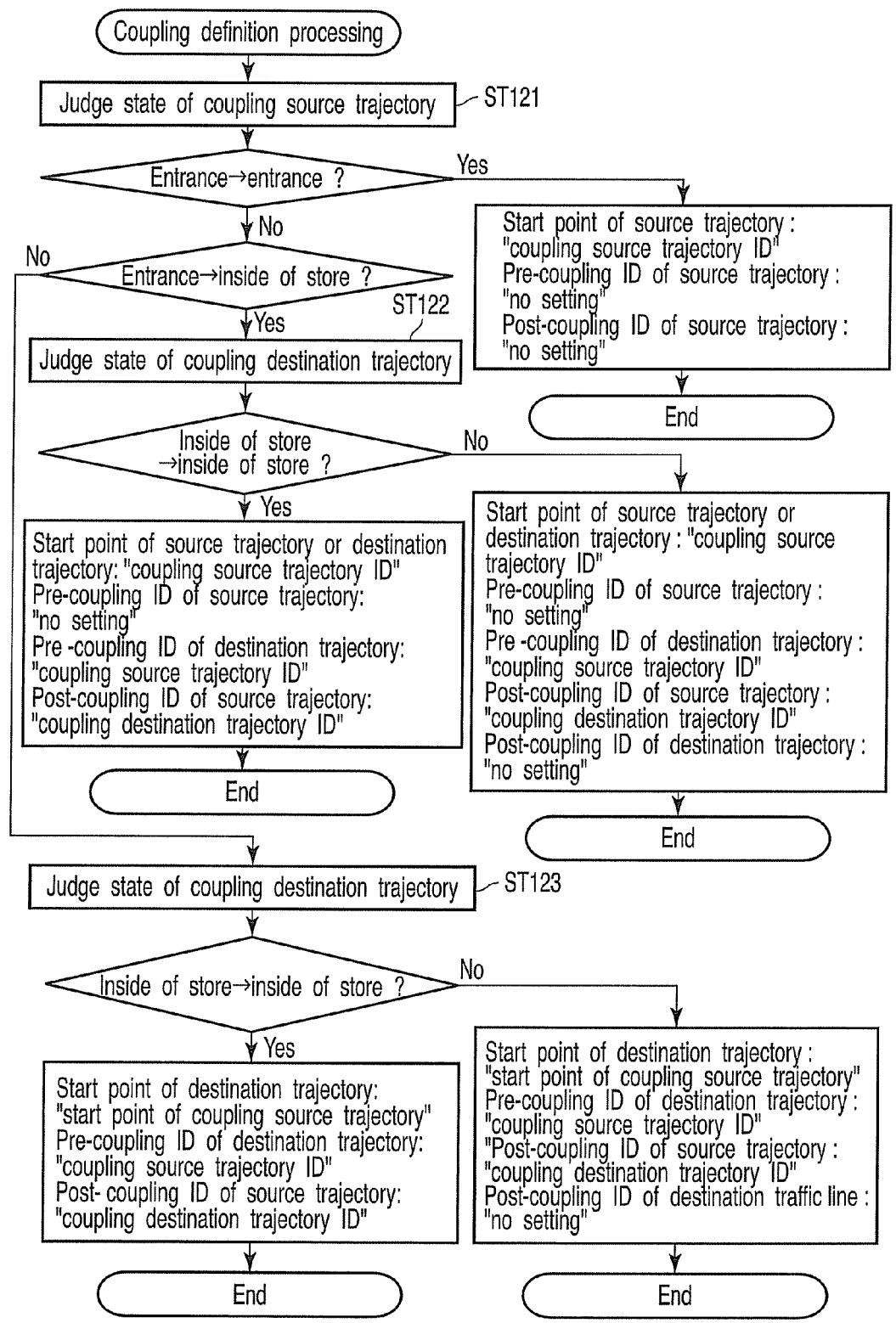
FIG. 15 is a flowchart showing a primary processing procedure of coupling definition processing depicted in FIG. 6.

A flowchart of FIG. 15 shows a processing procedure of the coupling definition processing in step 18. The control section 26 judges a state status of the edit trajectory data selected as the coupling source trajectory in step 121.

When the state status of the coupling source trajectory is "entrance→entrance" or "entrance", the coupling source trajectory is a complete trajectory. In this case, the control section 26 determines start point of the edit trajectory data selected as the coupling source trajectory as a "coupling source trajectory ID". Both a pre-coupling ID and a post-coupling ID are set to "no setting".

When the state status of the coupling source trajectory is "entrance→inside of store", the coupling source trajectory includes a start time point of tracing. In this case, the control section 26 judges a state status of the edit trajectory data selected as the coupling destination trajectory in step 122.

When the state status of the coupling destination trajectory is "inside of store→inside of store", the coupling destination trajectory is in the process of tracing. In this case, the control section 26 determines as a "coupling source trajectory ID" start point information of each of the two pieces of trajectory edit data selected as the coupling source trajectory and the coupling destination trajectory. Furthermore, a pre-coupling ID of the edit trajectory data selected as the coupling source trajectory is set to "no setting", and a post-coupling ID of the same is set to a "coupling destination trajectory ID". On the other hand, a pre-coupling ID of the edit trajectory data selected as the coupling destination trajectory is set to a "coupling source trajectory ID", and a post-coupling ID of the same is not set.

When the state status of the coupling destination trajectory is "inside of store→entrance" or "entrance", the coupling destination trajectory includes an end time point of tracing. In this case, the control section 26 sets as the "coupling source trajectory ID" the start point information of each of the two pieces of trajectory edit data selected as the coupling source trajectory and the coupling destination trajectory. Moreover, the pre-coupling ID of the edit trajectory data selected as the coupling source trajectory is set to "no setting", and the post-coupling ID of the same is set to the "coupling destination trajectory ID". On the other hand, the pre-coupling ID of the edit trajectory data selected as the coupling destination trajectory is set to the "coupling source trajectory ID", and the post-coupling ID of the same is set to "no setting".

When the state status of the coupling source trajectory is "inside of store→inside of store", the coupling source trajectory is in the process of tracing. In this case, the control section 26 judges a state status of the edit trajectory data selected as the coupling destination trajectory in step 123.

When the state status of the coupling destination trajectory is "inside of store→inside of store", the coupling destination trajectory is also in the process of tracing. In this case, the control section 26 sets start point information of the trajectory edit data selected as the coupling destination trajectory to a "start point of the coupling source trajectory". Moreover, a pre-coupling ID of the edit trajectory data selected as the coupling destination trajectory is set to a "coupling source trajectory ID", and a post-coupling ID is not set. Additionally, a post-coupling ID of the edit trajectory data selected as the coupling source trajectory is set to a "coupling destination trajectory ID".

When the state status of the coupling destination trajectory is "inside of store→inside of store", the coupling destination trajectory includes an end time point of tracing. In this case, the control section 26 sets the start point information of the edit trajectory data selected as the coupling destination trajectory to the "staring point of the coupling source trajectory". Further, the pre-coupling ID of the edit trajectory data selected as the coupling destination trajectory is set to the "coupling source traffic ID", and the post-coupling ID is set to "no setting". Furthermore, the post-coupling ID of the edit trajectory data selected as the coupling source trajectory is set as the "coupling destination trajectory ID".

When the coupling definition processing is terminated, the control section 26 judges whether the coupling source trajectory extending to a store exiting point has been defined in step 19. When the edit trajectory data selected as the coupling source trajectory is a complete trajectory, it is considered that the trajectory extending to the store exiting point has been defined. Moreover, even if the state status of the edit trajectory data selected as the coupling destination trajectory is "inside of store→entrance", it is considered that the trajectory extending to the store exiting point has been defined. In any other case, it is considered that the trajectory extending to the store exiting point has not been defined. When the trajectory extending to the store exiting point has not been defined, the control section 26 substitutes the edit trajectory data selected as the coupling destination trajectory for the coupling source trajectory in step 20. Further, the control section 26 again executes the processing of step 9 and subsequent steps.

When it is determined that the trajectory extending to the store exiting point has been defined in step 19, the control section 26 judges whether termination of selection of a trajectory has been instructed in step 20.

When continuing the trajectory confirming operation, the operator operates the input section 21 to instruct continuation of selection of a trajectory. When terminating the trajectory confirming operation, the operator manipulates the input section 21 to instruct termination of selection of a trajectory.

When continuation of selection of a trajectory is instructed, the control section 26 returns to the processing of step 6. That is, the control section 26 displays the trajectory list in the trajectory list display section 43 and waits for the next coupling source trajectory to be selected.

Figure 16:
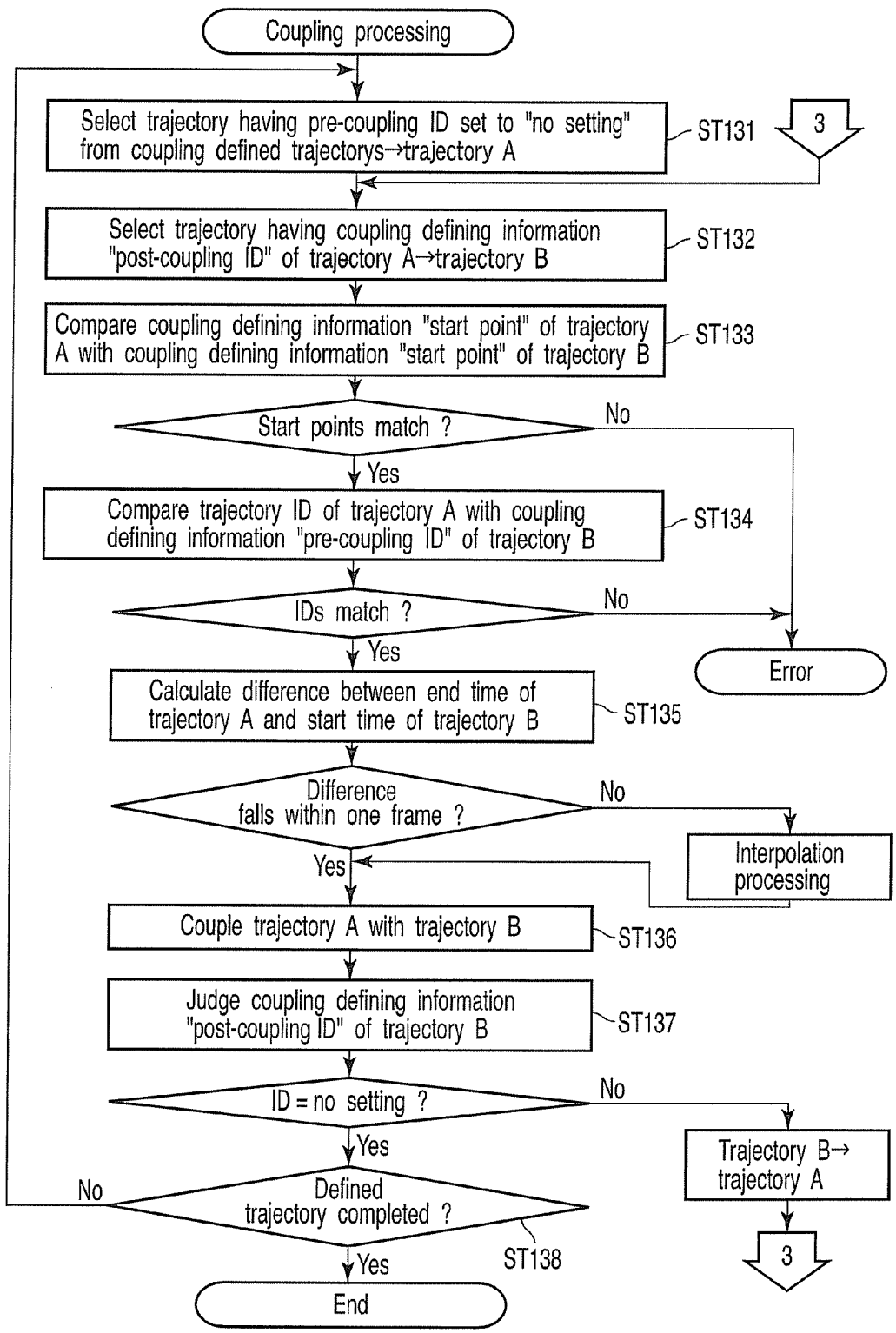
FIG. 16 is a flowchart showing a primary processing procedure of coupling processing depicted in FIG. 6.

When termination of selection of a trajectory is instructed, the control section 26 executes coupling processing in step 22. A flowchart of FIG. 16 shows a processing procedure of this coupling processing. That is, the control section 26 first searches the edit trajectory database 33 to select one piece of edit trajectory data having a pre-coupling ID set to "no setting" in step 131. The control section 26 recognizes the selected edit trajectory data as first trajectory data A.

Then, the control section 26 acquires a post-coupling ID of the edit trajectory data for this first trajectory data A in step 132. Furthermore, edit trajectory data having the post-coupling ID set as a trajectory ID is acquired from the edit trajectory database 33. The control section 26 recognizes the acquired edit trajectory data as second trajectory data B.

Subsequently, the control section 26 compares start point information of the first trajectory data A with start point information of the second trajectory data B in step 133. When both the pieces of start point information match with each other, the control section 26 compares a trajectory ID of the first trajectory data A with a pre-coupling ID of the second trajectory data B in step 134. When the IDs match with each other, the control section 26 calculates a time difference between a shooting date and time of index information corresponding to a last frame of the first trajectory data A and a shooting date and time of index information corresponding to a top frame of the second trajectory data B in step 135. Moreover, the control section 26 judges whether this time difference falls within one frame of a camera image (a coupling point judgment section).

When the time difference falls within one frame, the control section 26 determines that an end point of the first trajectory data A matches with a start point of the second trajectory data B. The control section 26 couples the first trajectory data A with the second trajectory data B in step 136. Specifically, the control section 26 reads all index information from the top frame to the last from of the second trajectory data B. Additionally, the read index information is added to the end of the index information corresponding to the last frame of the first trajectory data A. Further, the control section 26 substitutes an end point coordinate of the first trajectory data A for a two-dimensional coordinate of the index information corresponding to the last frame read from the second trajectory data B. Furthermore, the control section 26 executes the same processing as the state definition processing with respect to the first trajectory data A to redefine the state status. As a result, new edit trajectory data indicative of a trajectory from the start point of the coupling source trajectory to the end point of the coupling destination trajectory (a trajectory coupling section).

When the time difference in shooting date and time is longer than one frame, the end point of the first trajectory data A does not match with the start point of the second trajectory data B. In this case, the control section 26 executes an interpolation processing (an interpolating section). As the interpolation processing, there is linear interpolation that connects the end point of the first trajectory data A with the start point of the second trajectory data B by a straight line. Since movement of a customer in the store is mainly slow walking, linear interpolation can realize sufficient interpolation processing. After the interpolation processing, the control section 26 executes coupling processing in step 136.

Thereafter, the control section 26 checks a post-coupling ID of the second trajectory data B in step 137. When the post-coupling ID is other than "no setting", the control section 26 substitutes the first trajectory data A for the second trajectory data B to again execute the processing of step 132 and subsequent steps.

When the post-coupling ID of the second trajectory data B is "no setting", the control section 26 judges whether any other edit trajectory data having a pre-coupling ID set to "no setting" is present in step 138. If there is another edit trajectory data, the control section 26 again executes the processing of step 131 and subsequent steps. If there is no such data, the coupling processing is terminated.

When the coupling processing is terminated, the control section 26 detects complete trajectory data from the edit trajectory data stored in the edit trajectory database 33 in step 23. The complete trajectory data has a state status set to "entrance→entrance" or "entrance". That is, the control section 26 detects edit trajectory data having a state status set to "entrance→entrance" or "entrance" as the complete trajectory data (a complete trajectory detection section). The control section 26 outputs the complete trajectory data to the output file 25 (a complete trajectory output section). After the data is output, the trajectory editing program is terminated.

When the operator operates the input section 21 to select trajectory data that is a coupling source and trajectory data that is a coupling destination from the edit trajectory database 33 in this manner, trajectory data indicative of a trajectory from a start point of the trajectory data as the coupling source and an end point of the trajectory data as the coupling destination is automatically generated in the trajectory processing apparatus 20. Therefore, routes of a customer who has entered from the entrance/exit IN/OUT, walked around in the store, and exited the store after making payment at the checkout counter CH can be connected through one trajectory.

In this case, since the trajectory editing screen 40 displays a trajectory selected by the operator, the operator can couple a trajectory as a coupling source with a trajectory as a coupling destination while visually confirming them. Further, since the trajectory editing screen 40 also displays camera images obtained by shooting a customer whose trajectory has been displayed, the operator can couple trajectories while confirming whether a person having a coupling source trajectory is equal to a person having a coupling destination trajectory.

Furthermore, in the trajectory processing apparatus 20, only edit trajectory data determined to have at least one of a start point and an end point present in a monitoring target region is displayed in the list as a trajectory that is a coupling destination. Therefore, candidates for the coupling destination trajectory are narrowed down, thereby simplifying an selecting operation.

Moreover, in the trajectory processing apparatus 20, whether an end point position of trajectory data selected as a coupling source trajectory matches with a start point position of trajectory data selected as a coupling destination trajectory is judged. Additionally, when the end point does not match with the start point, a space between the end point and the start point is automatically interpolated.

Further, there may be a case where a customer is hidden behind, e.g., a store shelf, an advertising poster of an article for sale, or a POP placed in the store so that a trajectory cannot be traced from camera images. Even in such a case, a trajectory in a section where tracing is impossible can be manually created by the marker registering function in the trajectory processing apparatus 20.

Therefore, trajectories of a person who has entered from the entrance/exit, walked around in the store, and exited the stored can be assuredly coupled by one line.

Furthermore, in the trajectory processing apparatus 20, reference data that is used to judge validity of edit trajectory data is previously set. Moreover, each edit trajectory data stored in the edit trajectory database 33 is collated with the reference data to judge validity of the edit trajectory data. The edit trajectory data determined to be invalid is disabled. The disabled edit trajectory data cannot be used in subsequent processing.

As the reference data, there is data concerning a presence region and data concerning a presence time. The inside of the store as a monitoring region is partitioned into an enabled region where customers can be present and a disabled region where they cannot be present. Moreover, a trajectory having a very short tracing time can be ignored.

When data concerning the presence region is set as the reference data, edit trajectory data having at least one of a start point and an end point of a trajectory present in the disabled region is disabled in the trajectory processing apparatus 20. When data concerning the presence time is set as the reference data, edit trajectory data having an elapsed time from a start point to an end point of a trajectory being less than or equal to a threshold value in advance is disabled in the trajectory processing apparatus 20.

In this manner, the trajectory processing apparatus 20 can automatically disable unnecessary edit trajectory data that does not meet the reference data from a wide variety of edit trajectory data generated in the trajectory processing apparatus 20. Therefore, the subsequent editing operation for coupling trajectories can be efficiently carried out.

Moreover, in the trajectory processing apparatus 20, a trajectory of a movable body specified by edit trajectory data can be traced in accordance with each edit trajectory data stored in the edit trajectory database 33. Additionally, when a movable body cuts across a boundary between the enabled region and the disabled region, a point where the movable body has cut across is extracted as a change point. Edit trajectory data having the change point extracted therefrom is divided at this changed point. Of the divided partial trajectory data, data that does not meet the reference data is disabled.

In the trajectory data generation system 10, a trajectory may be drawn on, e.g., a store shelf where a customer cannot move depending on an accuracy of image processing. Even in such a case, a part which is apparently invalid as a trajectory can be assuredly eliminated in the trajectory processing apparatus 20. Therefore, the highly reliable trajectory editing operation can be realized.

Second Embodiment

Figure 17:
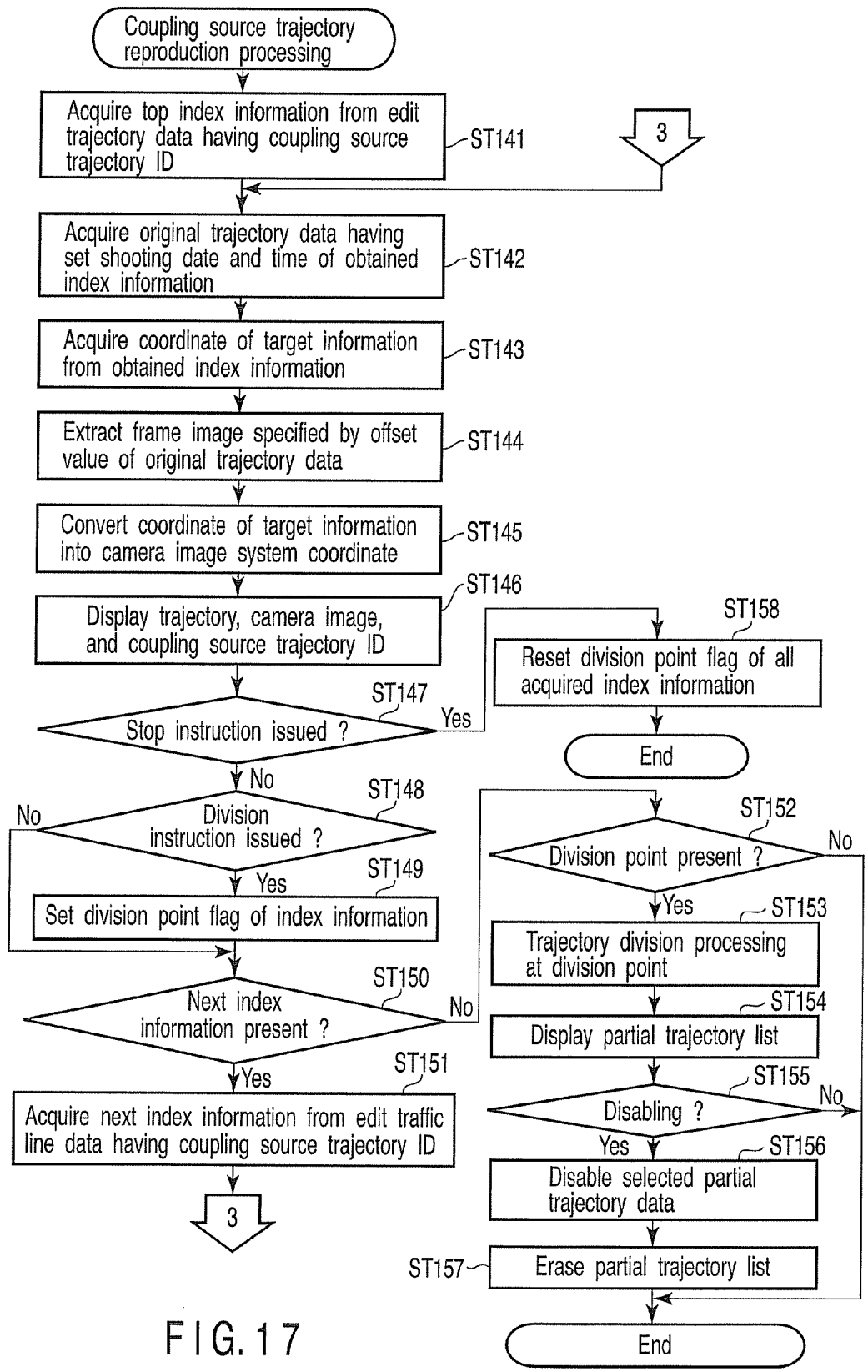
FIG. 17 is a flowchart showing another embodiment of coupling source trajectory reproduction processing.

A second embodiment in which the coupling source trajectory reproduction processing is changed will now be explained. A flowchart of FIG. 17 shows a processing procedure of this reproduction processing.

It is to be noted that, in the second embodiment, a division point flag S is added to one piece of index information constituting original trajectory data. Any other structures are the same as those in the first embodiment.

First, a control section 26 reads edit trajectory data having a set coupled source trajectory ID from an edit trajectory database 33 in step 141. Further, top index information is acquired from this edit trajectory data.

Then, the control section 26 searches an original trajectory database 31 to acquire original trajectory data having set shooting date and time information T of the obtained index information in step 142. Furthermore, an in-store coordinate (X, Y, H) is acquired from the obtained index information in step 143. Moreover, in step 144, a frame image specified by an offset value of the obtained original trajectory data is extracted from a camera image database 32.

Subsequently, the control section 26 converts the obtained in-store coordinate (X, Y, H), i.e., a three-dimensional coordinate in a world coordinate system into a coordinate in a corresponding camera image system in step 145. This conversion processing is executed based on the procedure depicted in FIG. 12.

When the in-store coordinate (X, Y, H), the frame image, and the camera image system coordinate are obtained, the control section 26 displays a trajectory in a trajectory display section 41 based on the in-store coordinate (X, Y, H) in step 146. Additionally, at the same time, the control section 26 also displays the frame image in a camera image display section 42. Further, it also displays a coupling source trajectory ID in the camera image display section 42.

Then, the control section 26 judges whether stopping reproduction of the trajectory has been instructed in step 147. When stopping reproduction has not been instructed, the control section 26 judges whether dividing the trajectory has been instructed in step 148 (a division point acceptance section). When division has not been instructed, the control section 26 judges whether the next index information is present in the edit traffic data having the set coupling source trajectory ID in step 150. When this information is present, the control section 26 acquires this index information in step 151. Furthermore, the processing of steps 142 to 149 is executed based on this index information.

With the above-explained processing, a trajectory associated with the edit trajectory data having the set coupling source trajectory ID is reproduced in the trajectory display section 41 in the trajectory editing screen 40. When dividing the trajectory that is in the process of reproduction, an operator operates an input section 21 to instruct dividing the trajectory.

When dividing the trajectory is instructed (YES in step 148), the control section 26 sets the division point flag S of the obtained index information to 1 in step 149. Subsequently, the control section 26 advances to the processing of step 150.

Moreover, when stopping reproduction of the trajectory, the operator manipulates the input section 21 to instruct stopping reproduction. When stopping reproduction is instructed (YES in step 147), the control section 26 resets the division point flags S of all the pieces of index information in the edit trajectory data having the set coupling source trajectory ID to zero in step 158. Then, the coupling source trajectory reproduction processing is terminated. When the coupling source trajectory reproduction processing is terminated, reproduction of the trajectory is stopped.

When stopping reproduction is not instructed, last index information is eventually acquired from the edit trajectory data having the set coupling source trajectory ID. When the last index information is acquired, the control section 26 judges whether the division point flags S have been set in all the pieces of index information in the edit trajectory data in step 152. When index information having the division point flag S set therein is not present, the coupling source trajectory reproduction processing is terminated.

When even one piece of index information having the division point flag S set therein is present, the control section 26 executes trajectory division processing at this division point in step 153 (a trajectory dividing section). This processing is executed simultaneously with the division processing at the change point in step 64 depicted in FIG. 10.

That is, the control section 26 adds a copy of the edit trajectory data having this coupling source trajectory ID set therein to the edit trajectory database 33. Furthermore, a trajectory ID of this copied edit trajectory data is substituted by a value obtained by adding 1 to a last trajectory ID. At this time, 1 is also added to the stored last trajectory ID. Moreover, a top index information to index information immediately before index information having the division point flag S set therein in the copied edit trajectory data are deleted. As a result, the index information having the division point flag S set therein becomes top index information.

The control section 26 resets the division point flag S of this top index information. Additionally, a two-dimensional coordinate of this top index information is determined as a start point coordinate (X0, Y0) of the edit trajectory data. Further, state definition processing is executed with respect to this edit trajectory data to update a state status. Thereafter, the control section 26 sets a partial trajectory status to ON to provide partial edit trajectory data (a partial trajectory registering section).

On the other hand, index information having the division point flag S set therein and subsequent pieces of index information in the copy source edit trajectory data are deleted. Furthermore, a two-dimensional coordinate of index information having the latest date and time in remaining pieces of index information is determined as an end point coordinate (Xn, Yn) of this edit trajectory data. Moreover, the same processing as the state definition processing is also executed with respect to this edit trajectory data to update a state status.

Additionally, a partial trajectory status is set to ON to provide partial edit trajectory data (the partial trajectory registering section).

In this manner, the edit trajectory data having the division point is automatically divided into a partial trajectory record before the division point and a partial trajectory record after the division point.

Subsequently, the control section 26 checks whether index information having the division point flag S set therein is present in the copied partial edit trajectory data (the partial trajectory record after the division point). When the index information having the division point flag S set therein is detected, this edit trajectory data is divided into partial trajectory data before the division point and partial trajectory data after the division point like the above explanation.

When the edit trajectory data having the division point is divided into the plurality of pieces of partial trajectory data each having no division point, the control section 26 displays a list of the plurality of pieces of partial trajectory data in a trajectory list display section 43 in step 154. Further, the control section 26 judges whether disabling is instructed in accordance with each partial trajectory data.

The operator manipulates the input section 21 to select partial trajectory data to be disabled from the trajectory list display section 43. When at least one partial trajectory record is selected (YES in step 155), the control section 26 sets a disabling status of the selected partial trajectory data to ON in step 156. Thereafter, the control section 26 erases the list of the partial trajectory data in step 157. Then, the coupling source trajectory reproduction processing is terminated.

When the coupling source trajectory reproduction processing based on the above-explained procedure is executed, the trajectory display section 41 in the trajectory editing screen 40 displays a trajectory having the trajectory ID selected from the trajectory list by the operator. Furthermore, camera images obtained at the same time point are displayed in the camera image display section 42 in synchronization with this trajectory. Therefore, the operator can readily judge whether the trajectory is a result of tracing one person by comparing movement of the trajectory with the camera images.

Moreover, the operator can manually forward or reverse an image of the coupling source trajectory and camera images synchronized therewith by operating a scroll bar 46 during reproduction of the coupling source trajectory. Additionally, the trajectory that is in the process of reproduction can be divided into two or more parts at a predetermined timing. Further, the divided partial trajectory data can be appropriately disabled.

For example, when the operator has confirmed that tracing a trajectory of the same person that is in the process of reproduction failed and changed to a trajectory of the other person during the process, he/she divides the one trajectory into trajectories of respective persons by a manual operation. Furthermore, trajectory data that has become unnecessary due to division is disabled by a manual operation. Executing division and the trajectory correcting operation for disabling as required enables effectively exploiting the trajectory data that has failed in tracing the same person.

It is to be noted that the present invention is not restricted to the foregoing embodiments, and constituent elements can be modified and embodied without departing from the scope of the invention on an embodying stage.

In each of the foregoing embodiments, the example where the trajectory editing screen 40 is partitioned into the trajectory display section 41 and the camera image display section 42 to display a trajectory and camera images synchronized with this trajectory has been explained. However, a first display section for displaying a trajectory and a second display section for displaying images may be provided to display a trajectory and camera images synchronized with this trajectory, respectively.

In each of the foregoing embodiments, the example where a trajectory and camera image as moving pictures synchronized with this trajectory are displayed has been explained. However, camera images that are still pictures rather than moving pictures may be displayed.

In each of the foregoing embodiments, the example where a disabling status of edit trajectory data is set to ON as means for disabling the edit trajectory data has been explained. However, the disabling means is not restricted thereto. For example, edit trajectory data to be disabled may be deleted from the edit trajectory database 33.

In each of the foregoing embodiments, a presence position and a presence time of a trajectory have been exemplified as a reference for disabling edit trajectory data. However, the items that can be the reference are not restricted thereto. For example, reference data concerning a length of a trajectory is set in advance. Furthermore, the trajectory length may be calculated based on edit trajectory data, and edit trajectory data having the trajectory length which does not meet the reference may be disabled.

In each of the foregoing embodiments, the change point flag F and the division point flag S are provided in index information. However, the change point flag F is used in the automatic division processing, and the division point flag S is used in the manual division processing. Therefore, one of these flags may be used as a common flag.

The trajectory processing apparatus according to this embodiment may have a function of just generating trajectory data indicative of a trajectory of a start point of first edit trajectory data to an end point of second edit trajectory data when an operator selects the first edit trajectory data and the second edit trajectory data from edit trajectory data stored in the edit trajectory database 33. That is, in FIG. 6, the disabling processing in step 4, the division processing in step 5, and the coupling destination candidate retrieval processing in step 12 may be omitted. However, it is needless to say that adding these types of processing enables efficiently executing the trajectory coupling operation as explained above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A trajectory processing apparatus comprising:
a trajectory database configured to store a position coordinate of a movable body detected from a camera image in association with data that specifies the camera image from which the movable body is detected;
a camera image database configured to store the camera image;
a data acquisition section configured to fetch the position coordinate of the movable body and the specifying data of the camera image from which the movable body is detected from the trajectory database;
a trajectory display section configured to display the position coordinate of the movable body fetched by the data acquisition section as a trajectory of the movable body;

a camera image acquisition section configured to acquire a camera image specified by the specifying data fetched by the data acquisition section from the camera image database;

a camera image display section configured to display the camera image acquired by the camera image acquisition section; and wherein the position coordinate of the movable body is a three-dimensional world coordinate system, and the apparatus further comprises:

a coordinate conversion section configured to convert the position coordinate into a camera image coordinate system from the world coordinate system; and a display control section configured to display an identifier of the movable body on a camera image displayed in the camera image display section in accordance with the coordinate in the camera image coordinate system.

2. The apparatus according to claim 1, wherein the trajectory database stores the position coordinate and time information of the movable body detected from the camera image in association with the data that specifies the camera image from which the movable body is detected, and the data acquisition section fetches the position coordinate of the movable body and the specifying data of the camera image from which the movable body is detected from the trajectory database in time-series in accordance with the time information.

3. The apparatus according to claim 1, wherein the trajectory display section displays the trajectory in one section obtained by dividing one screen, and the camera image display section displays the camera image in another section of the screen.

4. A trajectory processing method comprising:

storing a position coordinate of a movable body detected from a camera image in association with data that specifies the camera image from which the movable body is detected in a trajectory database;

storing the camera image in a camera image database;

fetching the position coordinate of the movable body and specifying data of the camera image from which the movable body is detected from the trajectory database;

displaying the position coordinate of the movable body fetched from the trajectory database as a trajectory of the movable body in a trajectory display section;

acquiring from the camera image database the camera image specified by the specifying data fetched from the trajectory database;

displaying the acquired camera image in a camera image display section; and wherein the position coordinate of the movable body is a three-dimensional world coordinate system, and the method further comprises:

configuring a coordinate conversion section to convert the position coordinate into a camera image coordinate system from the world coordinate system; and configuring a display control section to display an identifier of the movable body on a camera image displayed in the camera image display section in accordance with the coordinate in the camera image coordinate system.

5. The method according to claim 4, wherein the trajectory database stores the position coordinate and time information of the movable body detected from the camera image in association with data that specifies the camera image from which the movable body is detected, and the position coordinate of the movable body and the specifying data of the camera image from which the movable body is detected are fetched from the trajectory database in time-series in accordance with the time information when fetching them.

\* \* \* \* \*